(12) United States Patent
Vardakostas et al.

(10) Patent No.: US 11,533,943 B2
(45) Date of Patent: *Dec. 27, 2022

(54) SYSTEM AND METHOD FOR DISPENSING SAUCES ON FOODSTUFFS

(71) Applicant: Creator, Inc., San Francisco, CA (US)

(72) Inventors: Alexandros Vardakostas, San Francisco, CA (US); Thomas Hanson, Napa, CA (US); Michael Balsamo, San Francisco, CA (US); Taylor Nicholson, San Francisco, CA (US); James Brinkman, South San Francisco, CA (US); Oshin Nazarian, San Francisco, CA (US)

(73) Assignee: Creator, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/181,253

(22) Filed: Feb. 22, 2021

(65) Prior Publication Data

US 2021/0267255 A1   Sep. 2, 2021

Related U.S. Application Data

(63) Continuation of application No. 16/207,169, filed on Dec. 2, 2018, now Pat. No. 10,925,308, which is a
(Continued)

(51) Int. Cl.
*A23P 20/15* (2016.01)
*A23P 20/12* (2016.01)

(52) U.S. Cl.
CPC .............. *A23P 20/15* (2016.08); *A23P 20/12* (2016.08)

(58) Field of Classification Search
USPC ...... 118/16, 24, 695–698; 99/326, 327, 423, 99/450.4
See application file for complete search history.

(56) References Cited

U.S. PATENT DOCUMENTS 2,409,009 A    10/1946   Bakke
3,878,992 A     4/1975   MacManus
(Continued)

FOREIGN PATENT DOCUMENTS

CN    201167557 Y    12/2008
CN    101663160 A     3/2010
(Continued)

OTHER PUBLICATIONS

U.S. Appl. No. 17/254,813, filed Dec. 21, 2020, Brinkman, James.
(Continued)

*Primary Examiner* — Yewebdar T Tadesse
(74) *Attorney, Agent, or Firm* — Miller Johnson

(57) ABSTRACT

An automated food preparation system includes a sauce-dispensing system with sauce reservoirs, a scanning head, and tubes. Each of the sauce reservoirs is configured to contain a respective sauce. The scanning head includes openings each coupled with a respective sauce reservoir via a respective tube. A conveyance system transports a foodstuff between first and sauce positions. The scanning head is movable to dispense a selected sauce onto one or more regions of the foodstuff. A motor assembly is mounted to a mounting structure. The motor assembly is drivingly coupled to the scanning head and rotates the scanning head relative to the mounting structure. The scanning head includes a plate and a cylindrical shroud fixed relative to the plate. The openings extend through the plate. The plate is disposed within a cavity defined by the cylindrical shroud. The motor assembly rotates the plate and the cylindrical shroud about a longitudinal axis.

23 Claims, 10 Drawing Sheets

Related U.S. Application Data continuation of application No. 15/479,193, filed on Apr. 4, 2017, now Pat. No. 10,143,228.

(60) Provisional application No. 62/317,951, filed on Apr. 4, 2016.

(56) References Cited

U.S. PATENT DOCUMENTS

| | | | |
|---|---|---|---|
| 5,365,835 | A | 11/1994 | Naramura |
| 5,479,850 | A | 1/1996 | Anderson |
| 5,493,958 | A | 2/1996 | Naramura |
| 5,540,943 | A | 7/1996 | Naramura |
| 5,546,848 | A | 8/1996 | Naramura |
| 5,549,040 | A | 8/1996 | Naramura |
| 5,562,183 | A | 10/1996 | Naramura |
| 5,603,965 | A | 2/1997 | Daouse |
| 6,843,166 | B1 | 1/2005 | Li |
| 7,827,929 | B2 | 11/2010 | Garrison et al. |
| 10,143,228 | B2 * | 12/2018 | Vardakostas ............ A23P 20/12 |
| 2003/0085237 | A1 | 5/2003 | Kateman et al. |
| 2003/0159596 | A1 | 8/2003 | Tuyls et al. |
| 2004/0173108 | A1 | 9/2004 | Inoue et al. |
| 2010/0282781 | A1 | 11/2010 | Kinzie et al. |
| 2012/0328747 | A1 | 12/2012 | Levy |
| 2015/0053097 | A1 * | 2/2015 | Vardakostas ............ A23P 20/20 99/450.4 |
| 2015/0298081 | A1 | 10/2015 | McMath |
| 2017/0280763 | A1 | 10/2017 | Nazarian et al. |
| 2019/0098925 | A1 | 4/2019 | Vardakostas et al. |

FOREIGN PATENT DOCUMENTS

| | | |
|---|---|---|
| CN | 204540559 U | 8/2015 |
| CN | 104255850 B | 1/2016 |
| EP | 0600107 A1 | 6/1994 |
| EP | 1264543 A1 | 12/2002 |
| GB | 2517773 A | 3/2015 |
| JP | S57122755 A | 7/1982 |
| JP | S58146240 A | 8/1983 |
| JP | H06007127 A | 1/1994 |
| JP | H07215471 A | 8/1995 |
| JP | H07215472 A | 8/1995 |
| JP | H07227195 A | 8/1995 |
| JP | H07227196 A | 8/1995 |
| JP | H07227197 A | 8/1995 |
| JP | H07227198 A | 8/1995 |
| JP | H07227199 A | 8/1995 |
| JP | H07232807 A | 9/1995 |
| JP | H07255604 A | 10/1995 |
| JP | H07313373 A | 12/1995 |
| JP | H0871003 A | 3/1996 |
| JP | 3178899 B2 | 6/2001 |
| JP | 2003047431 A | 2/2003 |
| WO | WO-2007131009 A1 | 11/2007 |
| WO | WO-2008103607 A2 | 11/2008 |
| WO | WO-2012036447 A2 | 3/2012 |
| WO | WO-2016105586 A1 | 6/2016 |
| WO | WO-2019246465 A1 | 12/2019 |

OTHER PUBLICATIONS

International Search Report and Written Opinion for PCT Application No. PCT/US2017/025981, dated Aug. 18, 2017, 19 pages.
Extended European Search Report for EP Application No. 17779678.6; dated Oct. 25, 2019; 11 pages.
International Search Report and Written Opinion for PCT Application No. PCT/US2019/038342; dated Oct. 18, 2019; 14 pages.
Office Action for Chinese Patent Application No. 201780030477.6; dated Aug. 10, 2020; 19 pages.
International Preliminary Report on Patentability (Chapter II of the Patent Cooperation Treaty) dated Jun. 18, 2020; IPEA/US.
National Intellectual Property Administration of People's Republic of China, Notification of the First Office Action for CN App. No. 202110598366.3, dated Mar. 17, 2022.

* cited by examiner

SYSTEM AND METHOD FOR DISPENSING SAUCES ON FOODSTUFFS

CROSS-REFERENCE TO RELATED APPLICATIONS

This application is a continuation of U.S. patent application Ser. No. 16/207,169 (now U.S. Pat. No. 10,925,308), filed Dec. 2, 2018, which is a continuation of U.S. patent application Ser. No. 15/479,193 (now U.S. Pat. No. 10,143,228), filed Apr. 4, 2017, which claims the benefit of U.S. Provisional Application No. 62/317,951, filed Apr. 4, 2016. The entire disclosures of the applications referenced above are incorporated by reference.

FIELD

The present disclosure relates generally to the field of on-demand food preparation and more specifically to an automated food preparation system including systems and methods for dispensing sauces onto foodstuffs.

BACKGROUND

Preparation of foodstuffs (e.g., hamburgers, sandwiches, etc.) according to a consumer's custom order can be time-consuming and labor-intensive. Furthermore, the process of preparing custom-ordered foodstuffs is susceptible to errors and wide variations in quality. The present disclosure provides an automated food preparation system that can quickly and accurately prepare foodstuffs on-demand according to a wide variety of possible custom orders with limited human involvement.

SUMMARY

In one form, the present disclosure provides an automated food preparation system that may include a seasoning-dispensing system, a sauce-dispensing system, and a conveyance system. The seasoning-dispensing system may include a plurality of vessels, a dispersion nozzle, and a conduit coupled to the dispersion nozzle. Each of the vessels may be configured to contain a respective one of a plurality of seasonings. The vessels may be movable relative to the conduit and are in selective communication with the conduit. The sauce-dispensing system may include a plurality of sauce reservoirs, a scanning head, and a plurality of tubes. Each of the sauce reservoirs may be configured to contain a respective one of a plurality of sauces. The scanning head may include a plurality of openings each coupled with a respective one of the sauce reservoirs via a respective one of the tubes. The conveyance system may be configured to transport a foodstuff between a seasoning position in which the foodstuff is disposed below the dispersion nozzle and a sauce position in which the foodstuff is disposed below the openings. The scanning head may be movable relative to the sauce position to dispense a selected one or more of the sauces onto a selected one or more regions of the foodstuff.

In some configurations, the seasoning-dispensing system includes a holding chamber including a cavity having a seasoning inlet and an outlet. The seasoning inlet may receive seasoning dispensed from a selected one of the vessels. The outlet may be in fluid communication with the conduit.

In some configurations, the seasoning-dispensing system includes a grinder disposed vertically between the vessels and the holding chamber. The grinder may be configured to grind contents of at least one of the vessels prior to entering the holding chamber.

In some configurations, the seasoning-dispensing system includes a gas supply in selective communication with a gas inlet of the cavity of the holding chamber.

In some configurations, the seasoning-dispensing system includes a valve disposed between the gas supply and the gas inlet. The valve may be movable between a closed position preventing fluid communication between the gas supply and the cavity and an open position whereby pressurized gas from the gas supply is allowed to flow through the cavity from the gas inlet to the outlet to flush seasoning in the cavity through the outlet.

In some configurations, each vessel of the vessels includes an outlet and a metering plate disposed between the outlet and the holding chamber. The metering plate includes an aperture. The metering plate may be movable relative to the vessel between a first position in which the metering plate blocks the outlet of the vessel to prevent seasoning from exiting the vessel and a second position in which the aperture is at least partially aligned with the outlet of the vessel to allow seasoning to fall through the outlet of the vessel, through the aperture, and into the cavity of the holding chamber.

In some configurations, the seasoning-dispensing system includes an actuator including a cam engaging a lever extending outward from the metering plate. The actuator is configured to move the metering plate between the first and second positions.

In some configurations, the dispersion nozzle defines a cavity having an inlet fluidly coupled with the conduit and an outlet disposed below the inlet. The dispersion nozzle may include a deflector disposed within the cavity between the inlet and the outlet. The deflector may include a surface aligned with the inlet and configured to deflect seasoning falling into the cavity from the inlet.

In some configurations, the deflector includes a plurality of arms that extend radially outward therefrom and fixedly engage an inner diametrical surface of the dispersion nozzle to support the deflector within the cavity.

In some configurations, the dispersion nozzle includes a grid structure disposed between the deflector and the outlet of the dispersion nozzle. The grid structure may define a plurality of channels that receive seasoning deflected off of the deflector and extend vertically toward the outlet.

In some configurations, the deflector is movable relative to the inlet between a first position whereby the surface of the deflector is positioned to deflect seasoning in a uniform pattern across the cavity and a second position whereby the surface of the deflector is positioned to deflect a majority of the seasoning toward a selected region of the cavity.

In some configurations, the automated food preparation system includes a motor drivingly coupled to the deflector and configured to move the deflector between the first and second positions.

In some configurations, the sauce-dispensing system includes a mounting structure and a motor assembly mounted to the mounting structure. The motor assembly may be drivingly coupled to the scanning head and operable to rotate the scanning head relative to the mounting structure.

In some configurations, the scanning head includes a plate and a cylindrical shroud fixed relative to the plate. The openings may extend through the plate. The plate may be disposed within a cavity defined by the cylindrical shroud. An output shaft of the motor assembly may be received in the plate and may rotate the plate and the cylindrical shroud about a longitudinal axis of the cylindrical shroud.

In some configurations, the plurality of tubes includes a plurality of first tubes and a plurality of second tubes. First portions of the first tubes may be attached to and extend along a first portion of an inner diametrical surface of the cylindrical shroud and first portions of the second tubes may be attached to and extend along a second portion of the inner diametrical surface. Second portions of the first tubes may be attached to and extend partially around an inner structure that is fixed to the mounting structure and received in the cavity of the cylindrical shroud. Second portions of the second tubes may be attached to and extend partially around the inner structure.

In some configurations, the sauce-dispensing system includes a tubing-slack-management assembly received with the cavity of the cylindrical shroud. The tubing-slack-management assembly may be rotatable relative to the inner structure and the scanning head about the longitudinal axis of the cylindrical shroud. The tubing-slack-management assembly may include a first cylinder and a second cylinder. The first cylinder may engage third portions of the first tubes disposed along lengths of the first tubes between the first portions of the first tubes and the second portions of the second tubes. The second cylinder engages third portions of the second tubes disposed along lengths of the second tubes between the first portions of the second tubes and the second portions of the second tubes.

In some configurations, the first and second cylinders are disposed within the cavity of the cylindrical shroud and radially between the inner diametrical surface of the cylindrical shroud and the inner structure.

In some configurations, the first and second tubes curl inward from the second portions of the first and second tubes and extend up through an aperture in the mounting structure. The aperture in the mounting structure may be disposed radially inward relative to the second portions of the first and second tubes.

In some configurations, the tubing-slack-management assembly includes an upper plate attached to first axial ends of the first and second cylinders and a lower plate attached to second axial ends of the first and second cylinders. The upper and lower plates may be fixed relative to each other and are rotatable with the first and second cylinders relative to the inner structure and the scanning head.

In some configurations, the lower plate is disposed axially between the inner structure and the plate of the scanning head. The lower plate may include an aperture through which the output shaft of the motor assembly extends.

In another form, the present disclosure provides an automated food preparation system that may include a base member, a plurality of vessels, a dispersion nozzle, and a conduit. The base member may be rotatable about a rotational axis among a plurality of positions. The plurality of vessels may be mounted to the base member and arranged in a circular pattern around the rotational axis of the base member. Each of the vessels may be configured to contain a respective one of a plurality of seasonings. The dispersion nozzle may be configured to receive seasoning from a selected one or more of the vessels. A conduit may be coupled to the dispersion nozzle. A different one of the vessels is positioned to provide seasoning to the conduit at each of the plurality of positions of the base member. Each vessel of the vessels may include a metering plate having an aperture. The metering plate may be movable relative to the vessel between a first position in which the metering plate blocks an outlet of the vessel to prevent seasoning from exiting the vessel and a second position in which the aperture is at least partially aligned with the outlet of the vessel to allow seasoning to fall through the outlet of the vessel and through the aperture.

In some configurations, the automated food preparation system includes a holding chamber including a cavity having a seasoning inlet and an outlet. The seasoning inlet may receive seasoning dispensed from a selected one of the vessels. The outlet may be in fluid communication with the conduit.

In some configurations, the automated food preparation system includes a grinder disposed vertically between the vessels and the holding chamber. The grinder is configured to grind contents of at least one of the vessels prior to entering the holding chamber.

In some configurations, the automated food preparation system includes a gas supply in selective communication with a gas inlet of the cavity of the holding chamber.

In some configurations, the automated food preparation system includes a valve disposed between the gas supply and the gas inlet. The valve may be movable between a closed position preventing fluid communication between the gas supply and the cavity and an open position whereby pressurized gas from the gas supply is allowed to flow through the cavity from the gas inlet to the outlet to flush seasoning in the cavity through the outlet.

In some configurations, when the metering plate is in the second position, seasoning is allowed to fall through the outlet of the vessel, through the aperture, and into the cavity of the holding chamber.

In some configurations, the automated food preparation system includes an actuator having a cam engaging a lever extending outward from the metering plate. The actuator may be configured to move the metering plate between the first and second positions.

In some configurations, the dispersion nozzle defines a cavity having an inlet fluidly coupled with the conduit and an outlet disposed below the inlet.

In some configurations, the dispersion nozzle includes a deflector disposed within the cavity between the inlet of the cavity and the outlet of the cavity.

In some configurations, the deflector includes a surface aligned with the inlet of the cavity and configured to deflect seasoning falling into the cavity from the inlet of the cavity.

In some configurations, the deflector includes a plurality of arms that extend radially outward therefrom and fixedly engage an inner diametrical surface of the dispersion nozzle to support the deflector within the cavity.

In some configurations, the dispersion nozzle includes a grid structure disposed between the deflector and the outlet of the dispersion nozzle.

In some configurations, the grid structure defines a plurality of channels that receive seasoning deflected off of the deflector and extend vertically toward the outlet of the cavity.

In some configurations, the deflector is movable relative to the inlet of the cavity between a first position whereby the surface of the deflector is positioned to deflect seasoning in a uniform pattern across the cavity and a second position whereby the surface of the deflector is positioned to deflect a majority of the seasoning toward a selected region of the cavity.

In some configurations, the automated food preparation system includes a motor drivingly coupled to the deflector and configured to move the deflector between the first and second positions.

In some configurations, the base member is rotated to a selected one of the plurality of positions based on a custom order for a selected one of the plurality of seasonings.

In some configurations, the metering plate remains in the second position for an amount of time based on the custom order for the selected one of the plurality of seasonings.

In another form, the present disclosure provides an automated food preparation system that may include a conveyance system, a plurality of sauce reservoirs, a plurality of tubes, a scanning head, and a motor. The conveyance system may be configured to move a foodstuff into a sauce position. The plurality of sauce reservoirs may each have a pump and may each be configured to contain a respective one of a plurality of sauces. The plurality of tubes may each be in fluid communication with the pump of a respective one of the sauce reservoirs. The scanning head may include a plurality of openings each coupled with a respective one of the tubes. The motor may be drivingly coupled to the scanning head and operable to move to scanning head relative to the foodstuff in the sauce position to position a selected one or more of the openings over a selected one or more regions of the foodstuff.

In some configurations, the motor is mounted to a mounting structure and is operable to rotate the scanning head relative to the mounting structure.

In some configurations, the scanning head includes a plate and a cylindrical shroud fixed relative to the plate. The openings may extend through the plate. The plate may be disposed within a cavity defined by the cylindrical shroud.

In some configurations, an output shaft of the motor is received in the plate and rotates the plate and the cylindrical shroud about a longitudinal axis of the cylindrical shroud.

In some configurations, the plurality of tubes includes a plurality of first tubes and a plurality of second tubes. First portions of the first tubes may be attached to and may extend along a first portion of an inner diametrical surface of the cylindrical shroud. First portions of the second tubes may be attached to and may extend along a second portion of the inner diametrical surface. Second portions of the first tubes may be attached to and may extend partially around an inner structure that is fixed to the mounting structure and received in the cavity of the cylindrical shroud. Second portions of the second tubes may be attached to and may extend partially around the inner structure.

In some configurations, the automated food preparation system includes a tubing-slack-management assembly received with the cavity of the cylindrical shroud.

In some configurations, the tubing-slack-management assembly is rotatable relative to the inner structure and the scanning head about the longitudinal axis of the cylindrical shroud.

In some configurations, the tubing-slack-management assembly includes a first cylinder and a second cylinder. The first cylinder may engage third portions of the first tubes disposed along lengths of the first tubes between the first portions of the first tubes and the second portions of the second tubes. The second cylinder may engage third portions of the second tubes disposed along lengths of the second tubes between the first portions of the second tubes and the second portions of the second tubes.

In some configurations, the first and second cylinders are disposed within the cavity of the cylindrical shroud and radially between the inner diametrical surface of the cylindrical shroud and the inner structure.

In some configurations, the first and second tubes curl inward from the second portions of the first and second tubes and extend up through an aperture in the mounting structure.

In some configurations, the aperture in the mounting structure is disposed radially inward relative to the second portions of the first and second tubes.

In some configurations, the tubing-slack-management assembly includes an upper plate attached to first axial ends of the first and second cylinders and a lower plate attached to second axial ends of the first and second cylinders.

In some configurations, the upper and lower plates are fixed relative to each other and are rotatable with the first and second cylinders relative to the inner structure and the scanning head.

In some configurations, the lower plate is disposed axially between the inner structure and the plate of the scanning head.

In some configurations, the lower plate includes an aperture through which the output shaft of the motor extends.

The present disclosure also provides a system for dispensing spices on foodstuffs comprising: a conveyance system configured to support a foodstuff in a seasoning position; a metering system configured to meter a quantity of ground spices; a holding chamber configured to receive the quantity of ground spices from the metering system; and a conduit fluidly coupled to the holding chamber. The system can also include a dispersion nozzle: arranged over the seasoning position; fluidly coupled to the holding chamber via the conduit; defining a cavity opposite the conduit; defining a set of channels interposed between the cavity and an outlet end of the dispersion nozzle; and including a deflector arranged within the dispersion nozzle between the set of channels and the conduit and facing an outlet of the conduit. Furthermore, the system can include: a gas supply fluidly coupled to the holding chamber and configured to release a burst of gas into the holding chamber to dispense the quantity of ground spice into the dispersion nozzle and onto a surface of the foodstuff. In some variations of the system, the deflector: is operable between a first position and a second position; is configured to deflect ground spices received from the conduit toward a first side of the dispersion nozzle to bias deposition of ground spices across a surface of the foodstuff in the first position; and is configured to deflect ground spices received from the conduit across the set of channels to deposit ground spices substantially uniformly across a surface of a foodstuff in the second position.

The present disclosure also provides a method for dispensing spices onto foodstuffs includes: advancing a foodstuff under a dispersion nozzle; metering a quantity of ground spice into a holding chamber fluidly coupled to the dispersion nozzle; orienting a deflector within the dispersion nozzle toward a first side of the foodstuff; and releasing a burst of gas into the holding chamber to dispense the quantity of ground spice into the dispersion nozzle, toward the deflector, and onto a surface of the foodstuff at a first density proximal the first side of the foodstuff and at a second density less than the first density proximal a second side of the foodstuff opposite the first side of the foodstuff.

Further areas of applicability of the present disclosure will become apparent from the detailed description, the claims, and the drawings. The detailed description and specific examples are intended for purposes of illustration only and are not intended to limit the scope of the disclosure.

DETAILED DESCRIPTION

Figure 1:
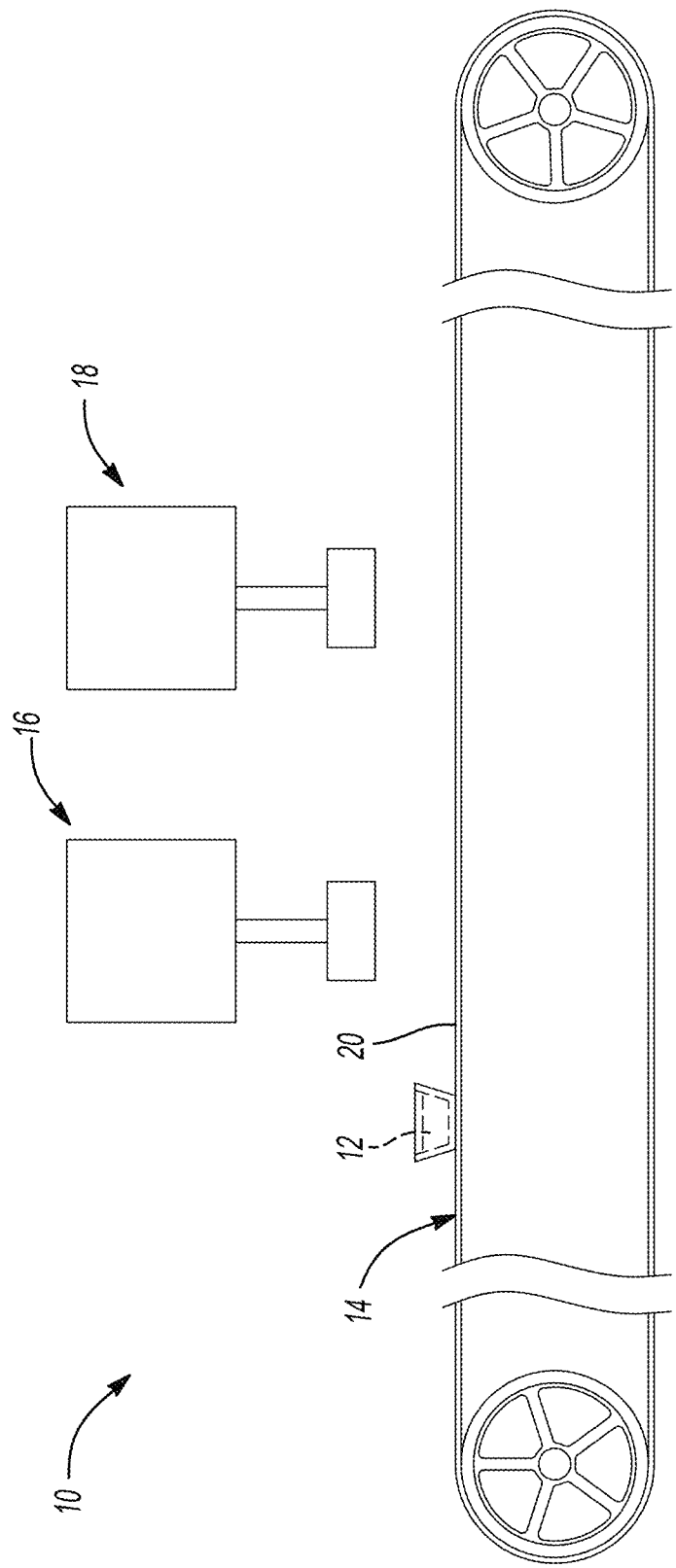
FIG. 1 is a schematic representation of an automated food preparation system according to the principles of the present disclosure.

With reference to FIG. 1, an automated food preparation system 10 is provided that can dispense seasoning (e.g., dry seasoning such as spices, herbs, salt, pepper, etc.) and/or sauces (e.g., condiments, hot sauces, barbeque sauces, salsas, spreads, salad dressings, and other liquids and viscous fluids) onto a surface of a foodstuff 12 (e.g., a meat patty, a bun, a hamburger, sandwich, wrap, taco, burrito, salad, soup, or other food product). The automated food preparation system 10 may include a conveyance system 14, a seasoning-dispensing system 16, and a sauce-dispensing system 18. The conveyance system 14 may transport the foodstuff 12 to one or both of the seasoning-dispensing system 16 and the sauce-dispensing system 18 where one or more seasonings and/or one or more sauces may be applied to the foodstuff 12.

In some configurations, the automated food preparation system 10 can include one or more systems (e.g., systems for preparing, assembling, and/or delivering food items) in addition to the seasoning-dispensing system 16 and the sauce-dispensing system 18. For example, the automated food preparation system 10 could include a patty grinding subsystem that grinds and presses custom hamburger patties from raw meat (e.g., based on custom patty orders), a patty cooking subsystem that cooks patties to a desired level of doneness (e.g., rare, medium, or well-done) based on a custom patty order, a bun dispenser and slicing subsystem that slices buns, a bun buttering subsystem that applies butter to each side of sliced buns before or after toasting the halves of the bun, a bun toaster subsystem that toasts each side of the bun or bun slices, a topping module that loads toppings onto bun heels (e.g., based on custom topping orders), and a boxing subsystem that closes completed hamburgers into cardboard or paper boxes for delivery to patrons. Therefore, in some configurations, the system 10 can be configured to selectively and preferentially automatically cook, assemble, package and dispense a food item such as a hamburger, for example, according to a custom order for a hamburger submitted by a patron.

The conveyance system 14 is configured to support a foodstuff 12 in a seasoning position (i.e., with the foodstuff 12 positioned below the seasoning-dispensing system 16, as shown in FIGS. 2, 3, 6, and 7) and in a sauce position (i.e., with the foodstuff 12 positioned below the sauce-dispensing system 18, as shown FIG. 8). Generally, the conveyance system 14 functions to intermittently advance the foodstuff 12 into the seasoning position in preparation to receive ground spices from the seasoning-dispensing system 16. In one example, the conveyance system includes a motor-driven conveyor belt 20 (as shown in the figures) configured to support and advance an open sandwich box containing the foodstuff 12 throughout stages of the system 10 corresponding to various subsystems of the system 10. In another example, the conveyance system 14 includes a set of phased paddles that cooperate to support and push an open sandwich box from one stage to a next stage within the automated foodstuff assembly apparatus. In the foregoing examples, the conveyance system 14 can: receive an open sandwich box from a box dispenser in a first stage; advance the open sandwich box to a second stage to receive a toasted bun heel in a first side of the box and a toasted bun crown in a second side of the box; sequentially advance the open sandwich box under each topping module in a set of topping modules to collect topping servings (e.g., tomato, onion, pickle, lettuce) from the topping modules onto the bun heel; advance the open sandwich box under a cheese dispenser and heater to collect and melt grated cheese on the bun crown; advance the open sandwich box to the seasoning position under a dispersion nozzle of the seasoning-dispensing system 16 to receive a dose of ground spices over the bun heel (e.g., over the topping serving(s)); retain the open sandwich box in the seasoning position as a patty is deposited over the bun heel; retain the open sandwich box in the seasoning position to receive another dose of ground spices onto the patty; advance the open sandwich box under the sauce-dispensing system 18 and retain the open sandwich box in the sauce position while one or more doses or sauce are applied to the foodstuff 12; and then advance the open sandwich box to a holding zone for collection by an operator or for collection directly by a patron who ordered the hamburger.

Alternatively, the conveyance system 14 can include cups or fingers that support bun heels and bun crowns directly and can intermittently advance and restrain bun heels and bun crowns in any of the foregoing stages. However, the conveyance system 14 can define any other form and can function in any other way to advance bun heel and bun crown (or any other foodstuff or "topping vehicle," such as a plate, a cup of soup, a bed of lettuce, etc.) into and out of the seasoning position. The conveyance system 14 can also support multiple bun heels and bun crowns (or multiple other foodstuff or topping vehicles) simultaneously and in different stages of the automated foodstuff assembly apparatus throughout operation.

Figure 2:
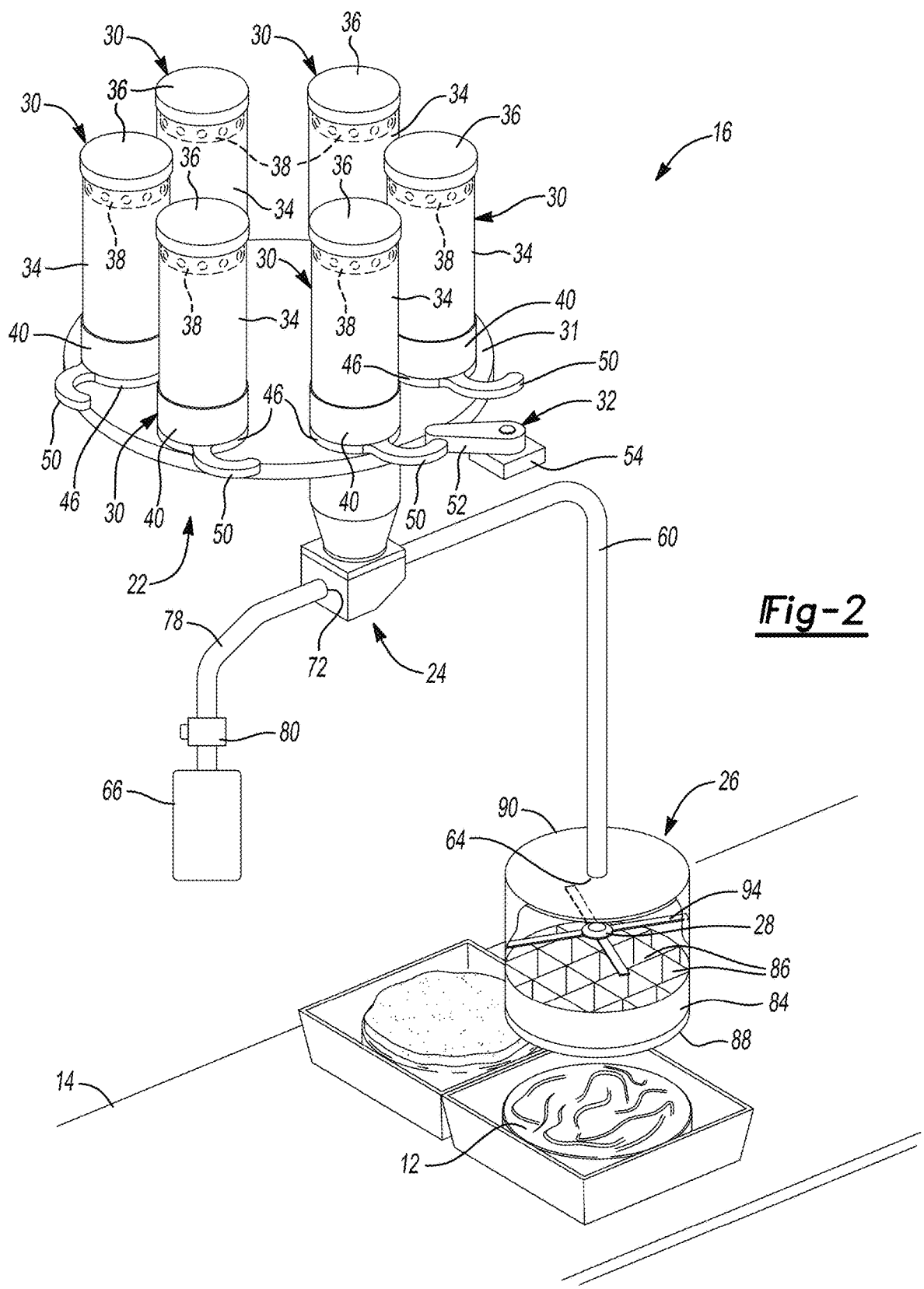
FIG. 2 is a perspective view of a seasoning-dispensing system of the automated food preparation system of FIG. 1.

Referring now to FIG. 2, the seasoning-dispensing system 16 may include a metering system 22, a holding chamber 24, and a dispersion nozzle 26. The seasoning-dispensing system 16 functions to meter a quantity of one or more ground spices or other seasoning and to dispense this quantity of ground spices or other seasoning onto a surface of the foodstuff 12. In some configurations, the seasoning-dispensing system 16 includes a deflector 28 (FIGS. 2 and 3) that aides in evenly distributing the spices or other seasoning onto the surface of the foodstuff 12.

In some configurations, the seasoning-dispensing system 16 can also dispense a quantity of ground spices or other seasoning onto a surface of the foodstuff 12 according to a selected distribution pattern, such as according to a uniform distribution pattern in which the ground spices or other seasoning are distributed substantially uniformly across the surface of the foodstuff 12, according to a forward-biased distribution pattern in which ground spices or other seasoning are distributed at greater density toward a front edge of the surface of the foodstuff 12, and/or according to a rearward-biased distribution pattern in which ground spices or other seasoning are distributed at greater density toward a back edge of the surface of the foodstuff 12.

In some configurations, the seasoning-dispensing system 16 includes a manipulable or movable deflector 96 (FIGS. 6 and 7) disposed within the dispersion nozzle 26 and can manipulate the deflector 96 to selectively bias distribution of spices or other seasoning across the surface of the foodstuff 12. For example, the system can dispense a quantity of a first seasoning substance (e.g., salt) onto the foodstuff 12 according to a forward-biased distribution pattern and dispense a quantity of a second different seasoning substance (e.g., sugar) onto the foodstuff according to a rearward-biased distribution pattern such that, when a patron consumes the foodstuff 12 from front to back, the patron first experiences a salty flavor that transitions to a sweet flavor as the patron reaches the back of the foodstuff 12. In this example, the seasoning-dispensing system 16 can preferentially season surfaces of the foodstuff 12 with select seasoning substances such that, when consumed by a patron, the foodstuff 12 initially appetizes the patron with a salty bite and concludes the dish with a sweet bite. In another example, the seasoning-dispensing system 16 can dispense a quantity of a sweet teriyaki ginger spice blend onto the foodstuff 12 according to a forward-biased distribution pattern and dispense a quantity of a spicy chimichurri spice blend onto the foodstuff 12 according to a rearward-biased distribution pattern such that a patron first experiences a sweet teriyaki ginger flavor that transitions into a spicy chimichurri flavor as the patron consumes the foodstuff 12 from front to back. In this example, the seasoning-dispensing system 16 can preferentially distribute seasoning substances onto the foodstuff 12 in order to achieve distinct flavor profiles in various regions of the foodstuff 12. Generally, the seasoning-dispensing system 16 can preferentially season the foodstuff 12 with one or more spices or other seasonings in order to achieve a dynamic taste experience for a patron consuming the foodstuff 12.

The seasoning-dispensing system 16 is described herein as a system for dispensing spices and/or other seasoning onto toppings, buns, and/or patties during automated construction of hamburgers. (The method is similarly described herein as a method for dispensing spices onto toppings, buns, and/or patties during automated construction of hamburgers.) However, the seasoning-dispensing system 16 can additionally or alternatively dispense distinct spices, spice blends, and/or one or more other seasonings onto a sandwich, a hamburger, a hot dog, a wrap, a taco, a burrito, a salad, a crepe, a bowl of soup, an omelet, or any other foodstuff.

The metering system 22 (FIG. 2) of the seasoning-dispensing system 16 may be configured to meter a quantity of ground spice or other seasoning and dispense the quantity of ground spice or other seasoning (e.g., one or more of ground pepper, salt, chili powder, garam masala, Jamaican jerk, teriyaki ginger, chimichurri, za'atar, etc.) into the holding chamber 24 in preparation to deposit the quantity of ground spice or other seasoning onto a surface of the foodstuff 12 in the seasoning position.

In one implementation, the metering system 22 can include a spice unit 30, a base member 31, and an actuator system 32. For example, the spice unit 30 can include: a vessel 34 defining a tube (e.g., a transparent tube) and configured to contain a volume of ground spice or ground spice blend or other seasoning or seasoning blend; and a lid 36 configured to mate with and seal over the top of the vessel 34. The lid 36 may include a hollow cylindrical portion 38 that is received in the vessel 34 and defines an internal cavity containing desiccant. Apertures in the cylindrical portion 38 allow for fluid communication with to the interior of the vessel 34 such that the desiccant in the cylindrical portion 38 can absorb moisture from air within the interior of the vessel 34 to keep the spices or other seasoning within the vessel 34 dry.

Figure 3:
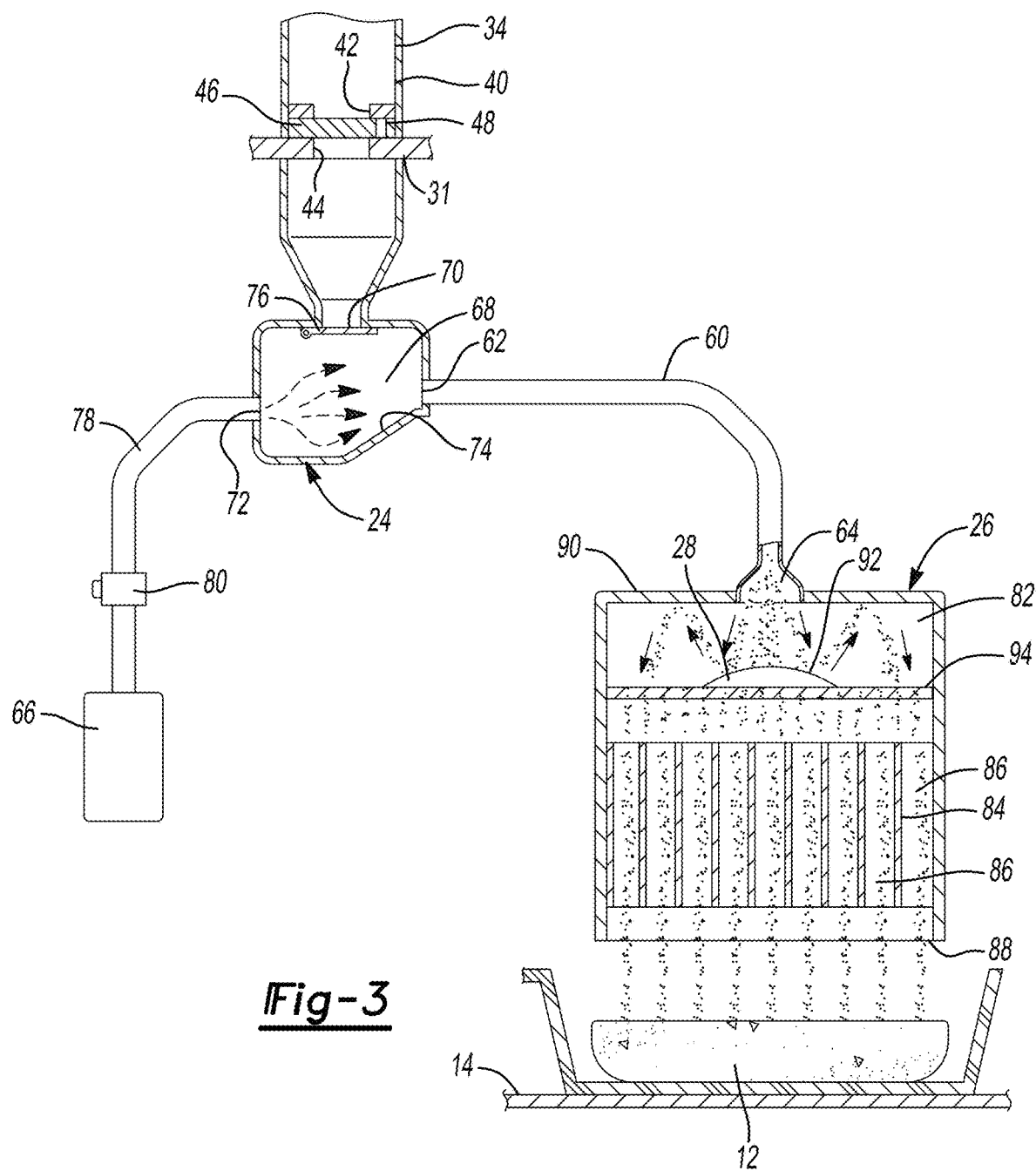
FIG. 3 is a partial cross-sectional view of the seasoning-dispensing system of FIG. 2.
Figure 4:
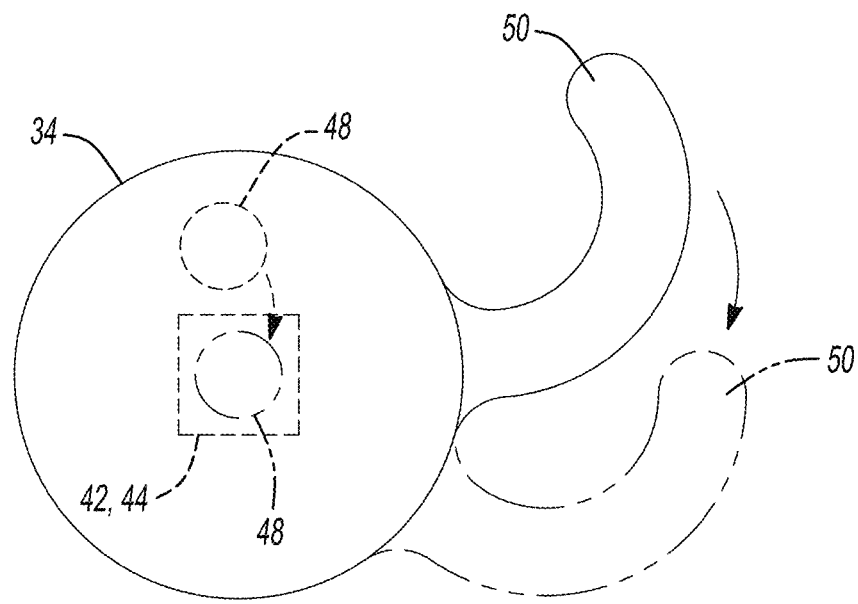
FIG. 4 is a plan view of a portion of a vessel and a metering plate of the seasoning-dispensing system of FIG. 2.

The spice unit 30 can also include a base 40 configured to mate with and seal over the bottom of the vessel 34 and including an outlet 42. The base 40 and the vessel 34 may be disposed on and supported by the base member 31. As shown in FIG. 3, the outlet 42 of the vessel 34 is aligned with an aperture 44 in the base member 31. A metering plate 46 may be interposed between the vessel 34 and the base member 31 and may define a bore 48 (or void or aperture of any suitable cross-sectional geometry) having a volume corresponding to a spice serving size (e.g., 0.01 cubic centimeter). As shown in FIG. 4, the metering plate 46 may be pivotable (e.g., via a hinge) between a first position in which the bore 48 is not exposed to the outlet 42 and the aperture 44 and a second position in which the bore 48 is exposed to the outlet 42 and the aperture 44. That is, in the first position, the metering plate 46 blocks communication between the outlet 42 and the aperture 44 so that spices or other seasoning in the vessel 34 are prevented from falling from the vessel 34 into the holding chamber 24; and in the second position, the bore 48 in the metering plate 46 is at least partially aligned with the outlet 42 and the aperture 44 to allow spices or other seasoning in the vessel 34 are allowed to fall from the vessel 34 into the holding chamber 24. The metering plate 46 may be spring-loaded to bias the metering plate 46 toward the first position. A lever 50 may extend from the metering plate 46 and may engage the actuator system 32.

The actuator system 32 can be configured to selectively advance the lever 50 to rotate the metering plate 46 from the first position into the second position to release a serving of spice from the vessel 34 to the holding chamber 24. For example, as shown in FIG. 2, the actuator system 32 can include a single-lobed cam 52 coupled to an output shaft of a servo motor 54, and the actuator system 32 can rotate the cam 52 forward and backward to advance and return the metering plate 46 between the first and second positions.

Alternatively, the actuator system 32 can include a cam with one or more lobes and can rotate the cam in a single forward direction to advance and return the metering plate between the first and second positions. In this implementation, the actuator system 32 can actuate the lever 50 through multiple cycles based on a quantity of ground spice specified for dispensation onto the foodstuff 12. For example, during a spice cycle, the actuator system 32 can actuate the lever 50 once to dispense a low amount of spice into the holding chamber 24, twice to dispense a moderate amount of spice into the holding chamber 24, and three times to dispense a large amount of spice into the holding chamber 24. Furthermore, the metering plate 46 can define multiple bores—defining identical or different volumes—patterned about a common axis, and the actuator system 32 can advance the lever 50 to various arcuate stop points in order to selectively expose bores in the metering plate 46 to the outlet 42 of the vessel 34 based on an amount of the ground spice designated for deposition onto the foodstuff 12 in the seasoning position. In particular, each bore in the metering plate 46 can be exposed to the outlet 42 of the vessel 34—and thus release its contents into the holding chamber 24—at a different arcuate position of the metering plate 46, and the actuator system 32 can selectively advance the lever 50 between these various arcuate positions in order to dispense various quantities of ground spice from the spice unit per single actuation of the actuator system 32.

Figure 5:
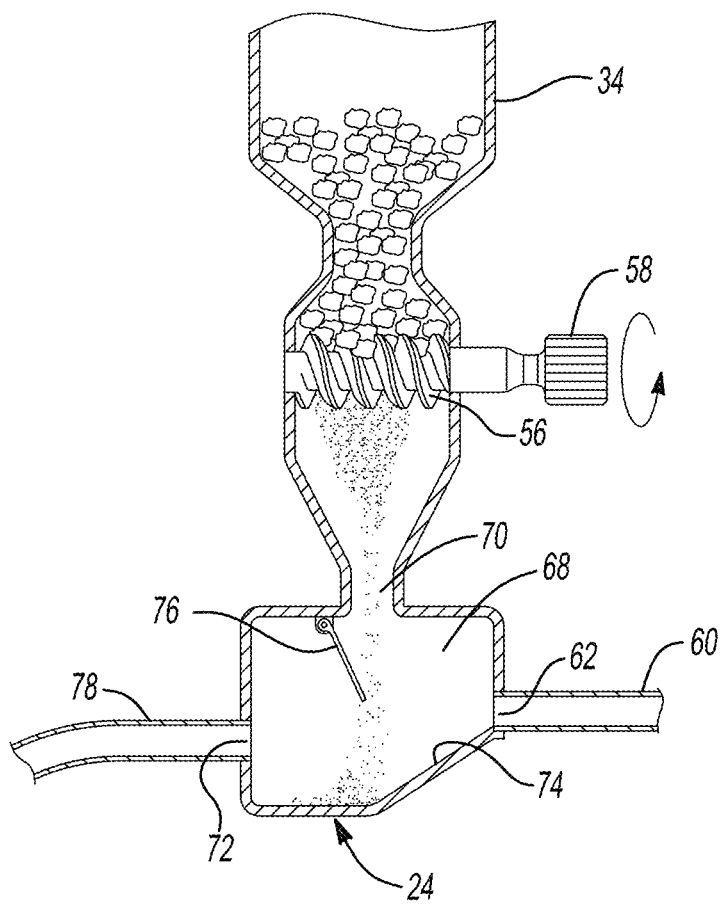
FIG. 5 is a partial cross-sectional view of another configuration of the vessel having a grinder.

In another implementation shown in FIG. 5, the vessel 34 may include a grinder 56 (e.g., a linear or rotary burr grinder) configured to receive whole spices from the vessel 34 and to grind whole spices. An actuator 58 may be configured to drive the grinder 56. In this implementation, the metering system 22 can actuate the actuator 58 for one or more preset durations in order to grind and dispense corresponding quantities of spices into the holding chamber 24. Alternatively, the holding chamber 24 can be supported by or can include a scale, and the metering system 22 can sample an output of the scale while actuating the actuator 58 in order to apportion a particular weight or mass of ground spice from the grinder 56 into the holding chamber 24.

In this implementation, the metering system can also include multiple spice units (i.e., multiple vessels 34 each mounted to the base member 31), such as a set of spice units in which each spice unit in the set is filled with a unique spice or unique spice blend. For example, the metering system 22 can include one actuator system and a motorized carousel (e.g., the base member 31 may be a motor-driven, rotatable carousel) configured to support multiple spice units, as shown in FIG. 2. In this example, as the conveyance system 14 advances the foodstuff 12 into the seasoning position, the seasoning-dispensing system 16 can read a seasoning order assigned to the foodstuff 12, and the motorized carousel can selectively index a particular spice unit—specified in the seasoning order into a dispense position adjacent the actuator system 32. The actuator system 32 can then actuate the lever 50 on the particular spice unit 30 a number of times and/or by a particular arcuate distance in order to dispense an amount of the ground spice in the particular spice unit corresponding to an amount (e.g., a small, moderate, large amount or 0.01 g, 0.02 g, or 0.03 g) of the spice specified in the seasoning order for the foodstuff 12. In this example, the dispense position can be arranged over the holding chamber 24 such that the spice unit 30 in the dispense position releases ground spices into the holding chamber 24 when actuated by the actuator system 32.

Furthermore, in this example, for a seasoning order that specifies multiple spices or multiple spice blends (of the same distribution pattern), the motorized carousel and the actuator system can cooperate to serially dispense ground spices from multiple spice units into the holding chamber 24 before triggering a gas supply to blast spices in the holding chamber 24 into the dispersion nozzle 26 and then onto the corresponding foodstuff 12 below. In this example, each spice unit 30 and/or each vessel 34 in the motorized carousel configured to receive a spice unit can be labeled with an identifier, such as a barcode, QR code, RFID tag, or textual code, etc., and the metering system can read these identifiers (e.g., with a barcode scanner, a RFID reader, a camera, etc.) throughout operation to identify contents of each spice unit and the position of each spice unit in the motorized carousel.

Alternatively, in the foregoing implementations, each spice unit 30 can be arranged statically within the metering system, and each spice unit can include a discrete corresponding actuator 32 configured to release or grind spices from the spice unit. For example, the metering system 22 can include a funnel that collects ground spices released from each spice unit and deposits these ground spices into the holding chamber. In this example, the metering system 22 can actuate multiple actuators simultaneously in order to release and/or grind spices from multiple spice units into the holding chamber simultaneously, such as according to a seasoning order for a foodstuff that specifies multiple spices and/or spice blends (applied according to the same distribution pattern as described below).

In other embodiments, the metering system can include any other structure and can function in any other way to selectively dispense pre-ground spices and/or to selectively grind and dispense spices into the holding chamber.

The holding chamber 24 of the seasoning-dispensing system 16 is configured to receive the quantity of a ground spice from the metering system 22. As shown in FIGS. 2 and 3, a conduit 60 is fluidly coupled to an outlet 62 of the holding chamber 24 and to an inlet 64 of the dispersion nozzle 26. Generally, the holding chamber 24 functions to collect ground spices from the metering system 22 and to hold these spices until a target amount of spices has been released from one or more spice units 30 specified in a seasoning order for a foodstuff. Once the target amount of spices has been released into the holding chamber 24, a gas supply 66 can release a burst of gas (e.g., compressed carbon dioxide, air or nitrogen) into the holding chamber 24, thereby blowing the ground spices into the conduit 60, then into the dispersion nozzle 26, and finally onto the foodstuff 12 below.

In one implementation (shown in FIG. 3), the holding chamber 24 defines: a cavity 68; a spice inlet 70 over the cavity 68; a gas inlet 72 on a first side of the cavity 68; and the outlet 62 on a second side of the cavity 68 opposite the gas inlet 72, terminating above the base of the cavity 68, and connected to the conduit 60. In this implementation, the cavity 68 can collect spices gravity-fed from the metering system 22 and hold these spices below the outlet 62 (i.e., below the inlet of the conduit). The cavity 68 can also define a ramp 74 inclined up to the outlet 62 and configured to guide spices into the conduit 60 when a blast of gas is released by the gas supply 66, as shown in FIG. 3. The holding chamber 24 can also define the gas inlet 72 opposite the outlet 62 such that gas flows with limited turbulence from the gas inlet, across the cavity, and into the outlet. Furthermore, the holding chamber 24 can include a lid or check valve 76 configured to seal over the spice inlet 70 when the gas supply 66 is triggered to release a burst of gas into the holding chamber 24. Alternatively, a spice unit 30 in the dispense position over the holding chamber 24 can seal over the spice inlet of the holding chamber. However, the holding chamber 24 can define any other geometry.

The conduit 60 is interposed between the outlet 62 of the holding chamber 24 and the inlet 64 of the dispersion nozzle 26. In some implementations, the metering system 22 and holding chamber 24 are arranged within the system 10 substantially remotely from the dispersion nozzle and the seasoning position, and the conduit 60 snakes through the system 10 from the outlet 62 of the holding chamber 24 to the inlet 64 of the dispersion nozzle 26 and communicates spices from the holding chamber 24 to the dispersion nozzle 26 when the gas supply 66 releases a burst of gas into the holding chamber 24. For example, the conduit 60 can define a stainless steel tube. The conduit 60 can also be electrically grounded or electrically charged, etc. to reduce collection of ground spices on its interior walls, such as due to static electrical charge in the conduit 60. However, the conduit 60 can be of any other form.

The gas supply 66 is fluidly coupled to the holding chamber 24 and is configured to release a burst of gas into the holding chamber 24 to dispense the quantity of ground spice into the conduit 60, into the dispersion nozzle and onto a surface of the foodstuff 12. Generally, the gas supply 66 functions to release a burst of gas (e.g., compressed carbon dioxide, air or nitrogen) into the holding chamber 24 to dislodge spices in the holding chamber 24 into the conduit 60 and on to the dispersion nozzle 26.

In one implementation, the gas supply 66 includes a gas reservoir or tank containing pressurized gas (e.g., compressed carbon dioxide, air or nitrogen) coupled to the holding chamber 24 by a gas conduit 78. A solenoid valve 80 may be disposed along the gas conduit 78 and may selectively allow and prevent flow of gas through the gas conduit 78. In this implementation, once the holding chamber 24 has been loaded with one or more ground spices or spice blends, a control module of the system 10 can trigger the solenoid valve 80 to open for a particular period of time (e.g., one second) to release pressurized gas into the holding chamber 24. In this implementation, the gas supply 66 can also include a regulator that regulates the flow and/or pressure of gas released into the holding chamber. For example, the regulator can limit the flow rate of gas from the gas supply to 30 cfm or limit gas supplied by the gas supply to a pressure of 5 psi. However, the gas supply 66 can be of any other form and controllable in any other way to blow ground spices from the holding chamber 24 into the conduit 60.

In some configurations, after the gas supply 66 blasts the spices in holding chamber 24 through the conduit 60 and onto the foodstuff 12, the solenoid valve 80 may release a subsequent burst of gas from the gas supply 66 to flush out and cleanse the holding chamber 24, conduit 60 and dispersion nozzle 26. This subsequent burst of gas from the gas supply 66 may clear and residual spices remaining in the holding chamber 24, the conduit 60 or the dispersion nozzle 26.

As shown in FIGS. 2 and 3, the dispersion nozzle 26 may be arranged over the conveyance system 14 at the seasoning position. The dispersion nozzle 26 is fluidly coupled to the holding chamber 24 via the conduit 60. The dispersion nozzle 26 may be a generally cylindrical member defining an interior cavity 82 opposite the conduit 60. The cavity 82 may include a channel insert (i.e., a grid structure) 84 that defines a set of channels 86 interposed between the inlet 64 and an open outlet end 88 of the dispersion nozzle 26. The deflector 28 may be arranged within the dispersion nozzle 26 between the set of channels 86 and the inlet 64 and facing an outlet of the conduit. Generally, the dispersion nozzle 26 functions to receive ground spices from holding chamber 24—via the conduit 60—and to disperse these spices across the breadth of a foodstuff 12 below.

In some implementations, the dispersion nozzle 26 includes a body defining a cylindrical interior volume of a diameter similar to the diameter (or other width dimension) of a foodstuff type (e.g., a hamburger bun) commonly passed into the seasoning position. The body includes a closed top end (i.e., a closed axial end) 90 at a first end and is open at the outlet end 88 facing the seasoning position below. The top end 90 defines the inlet 64 connected to the outlet of the conduit 60. The dispersion nozzle 26 may also include the channel insert 84 spanning the outlet end 88, wherein the channel insert 84 defines a set of channels 86 having axes parallel to a longitudinal axis of the body, as shown in FIG. 3. For example the channel insert 84 can include a thin-walled stainless steel honeycomb insert defining a set of polygonal channels 86 of similar cross-sectional areas. The channel insert 84 can function to collimate spices into a substantially uniform dispersion across the breadth and depth of the cavity 82. For example, the channel insert 84 can define a set of channels 86 extending from a first position within the body at which spices—reflected by the deflector 28—are substantially uniformly distributed across the breadth and depth of the cavity and to a second position below the first position in order to prevent these partitioned spices from re-coalescing (e.g., due to fluid currents within the dispersion nozzle) before being deposited onto the foodstuff 12 below. The dispersion nozzle 26 can also include multiple discrete channel inserts within the cavity 82, such as two discrete channel inserts stacked and vertically offset within the cavity 82.

As shown in FIG. 3, the deflector 28 may define a surface 92 facing, substantially axially aligned with, and vertically offset from the inlet 64. The surface 92 is configured to reflect ground spices passing through the inlet 64 back toward the top end 90 of the body of the dispersion nozzle 26, thereby dispersing ground spices across the cross-section of the cavity 82 to achieve substantially uniform distribution of ground spices on the foodstuff 12 below. In some configurations, the surface 92 of the deflector 28 can be a flat (i.e., planar, as shown in FIG. 3) plate, a conical body tapered toward the inlet, a convex (e.g., hemispherical or domed, as shown in FIG. 3) surface facing the inlet 64, or a surface of any other suitable geometry that reflects incident ground spices discharged from the conduit 60 back toward the top end 90 of the body. The surface 92 of the deflector 28 can have width substantially less than a width of the interior volume of the body, such as less than 10% of the width of the interior volume of the body, for example. The deflector 28 can be vertically offset below the inlet 64 by a distance sufficient to enable ground spice to disperse substantially fully across the full cross section of the cavity 82. The dispersion nozzle 26 can also include one or more (narrow) vanes or arms 94 that extend from the interior wall (e.g., an inner diametrical surface) of the body toward the axial center of the body to support the deflector 28 within the cavity 82. Alternatively, the deflector 28 can be mounted directly to and can be supported by the channel insert 84 between the channel insert 84 and the inlet 64.

The top end 90 of the body of the dispersion nozzle 26 can be flat, vaulted, domed (e.g., hemispherical), rippled, or of any other profile or surface finish to guide ground spices—reflected off of the deflector 28 and incident on the top end 90 of the body—across the full cross-section of the body in order to achieve uniform distribution of ground spices across the channel insert 84 and thus onto the foodstuff 12 below.

In another implementation, the dispersion nozzle 26 can define a conical or frustoconical interior tapering toward the inlet 64 coupled to the conduit 60, and the dispersion nozzle 26 can include vanes or other channels extending proximal the inlet to an outlet over the seasoning position below. However, the dispersion nozzle 26 can define any other structure of any other form suitable to disperse ground spices across the seasoning position.

Figure 6:
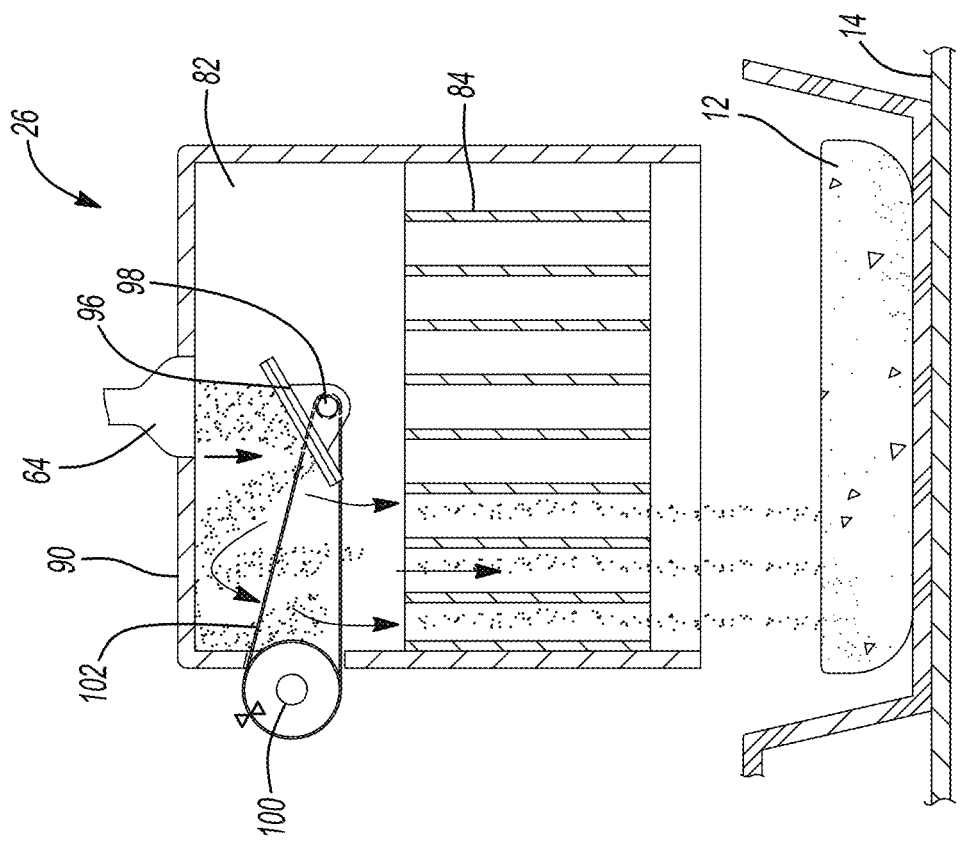
FIG. 6 is a cross-sectional view of a dispersion nozzle of the seasoning-dispensing system with a deflector in a first position.
Figure 7:
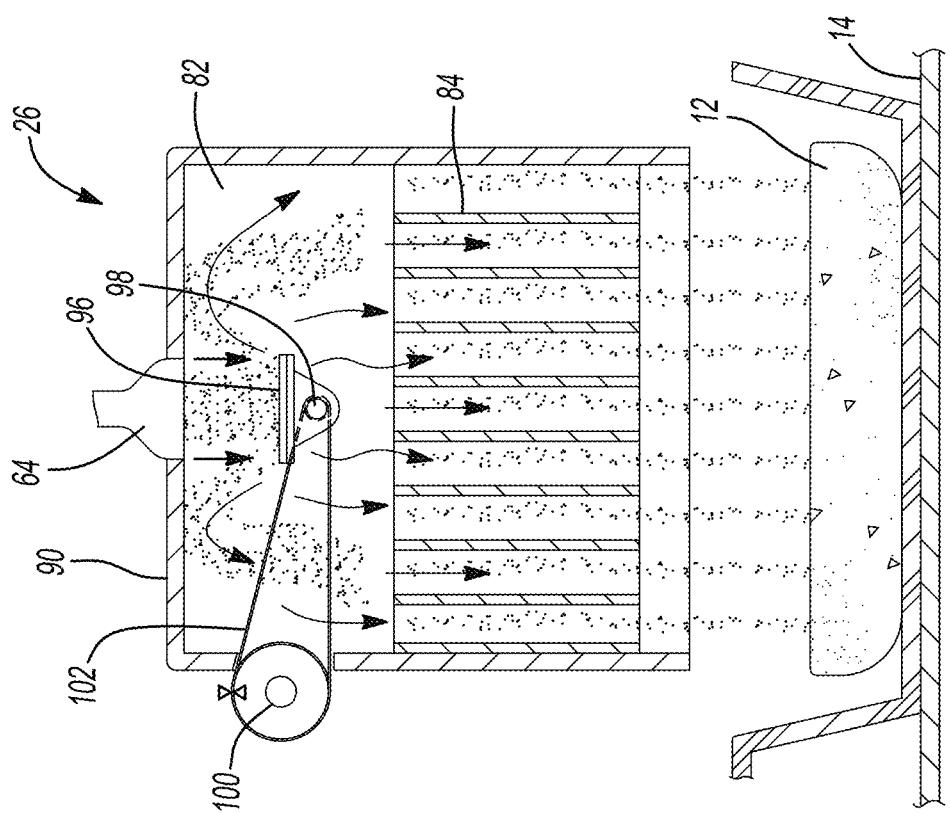
FIG. 7 is a cross-sectional view of the dispersion nozzle of FIG. 6 with the deflector in a second position.

FIGS. 6 and 7 depict another deflector 96 that can be incorporated into the dispersion nozzle 26 instead of or in addition to the deflector 28. The deflector 96 is movable among a plurality of positions, such as between a first position (FIG. 6) and a second position (FIG. 7) and can be positioned at the first and second positions and at any position between the first and second positions. When in the second position or a position between the first and second positions, the deflector 96 is configured to deflect ground spices received from the conduit 60 toward a first side of the dispersion nozzle 26 to bias deposition of ground spices across a surface of the foodstuff 12. When the deflector 96 is in the first position, the deflector 96 is configured to deflect ground spices received from the conduit 60 across the set of channels 86 to deposit ground spices substantially uniformly across a surface of the foodstuff 12. Generally, in this implementation, the control module of the system 10 can move the deflector 96 between various positions to preferentially scatter incident spices discharged from the conduit 60 toward various regions of the dispersion nozzle 26, thereby controlling distribution of spices across the foodstuff 12 in the seasoning position.

In some implementations, the dispersion nozzle 26 may include an elongated beam or axle 98 extending through the cavity 82 perpendicular to the longitudinal axis of the dispersion nozzle 26, and the deflector 96 is mounted to the beam 98. In this implementation, the system 10 also includes a deflector actuator 100 (controlled by the control module of the system 10) coupled to the beam 98 by a chain or belt 102 and configured to rotate the beam 98 and the deflector 96 about a longitudinal axis of the beam 98 relative to the inlet 64. For example, the deflector actuator 100 can pivot the beam to a 0° position (i.e., the first position; shown in FIG. 6) to square the deflector 96 to the inlet 64 of the dispersion nozzle 26. When the gas supply 66 releases a blast of gas into the holding chamber 24 to drive a quantity of spices through the conduit 60 and thus onto the deflector 96 in the 0° position, the deflector 96 can reflect these spices back toward the top end 90 of the dispersion nozzle 26 relatively uniformly across the width of the dispersion nozzle 26 in order to achieve substantially uniform distribution of the spices across the foodstuff 12 below, as described above. The deflector 96 can also pivot the beam to a 15° position to position the deflector 96 at a forward angle relative to the inlet 64. When the gas supply 66 then releases a blast of gas into the holding chamber 24 to drive a quantity of spices through the conduit 60 and thus onto the deflector 96 in the 15° position, the deflector 96 can reflect these spices back toward the top end 90 of the dispersion nozzle 26 but preferentially toward the front of the dispersion nozzle 26 such that spices are preferentially deposited toward a corresponding side of the foodstuff 12 below, such as with a highest density of the spice at the "front" of the foodstuff 12. Similarly, the deflector 96 can pivot the beam to a 30° position (which, in some configurations, is the second position) to position the deflector 96 at a steeper forward angle relative to the inlet 64. When the gas supply 66 then releases a blast of gas into the holding chamber 24 to drive a quantity of spices through the conduit 60 and thus onto the deflector 96 in the 30° position, the deflector 96 can preferentially reflect these spices even more so toward the front of the dispersion nozzle 26 such that spices are deposited even more preferentially toward the corresponding side of the foodstuff 12.

Furthermore, the deflector 96 can also pivot the beam to a −15° position (i.e., a third position) to position the deflector 96 at a forward angle relative to the inlet 64. When the gas supply 66 then releases a blast of gas into the holding chamber 24 to drive a quantity of spices through the conduit 60 and thus onto the deflector 96 in the −15° position, the deflector 96 can reflect these spices back toward the top end 90 of the dispersion nozzle 26 but preferentially toward the rear of the dispersion nozzle 26 such that spices are preferentially deposited toward a corresponding side of the foodstuff 12 below, such as with a highest density of the spice at the "rear" of the foodstuff 12. Similarly, the deflector 96 can pivot the beam to a −30° position (i.e., a fourth position) to position the deflector 96 at a steeper rearward angle relative to the inlet 64. When the gas supply 66 then releases a blast of gas into the holding chamber 24 to drive a quantity of spices through the conduit 60 and thus onto the deflector 96 in the 30° position, the deflector 96 can preferentially reflect these spices even more so toward the rear of the dispersion nozzle 26 such that spices are deposited even more preferentially toward the corresponding side of the foodstuff 12. However, the deflector actuator 100 can position the deflector 96 at any other angle relative to the inlet 64 in order to achieve any other degree of bias for distribution of spices across the foodstuff 12 below.

In another implementation, the deflector 96 defines a surface facing the inlet at a (fixed or variable) angle and is pivotable about an axis substantially parallel to the inlet 64 (i.e., parallel to or collinear with the longitudinal axis of the body of the dispersion nozzle 26). In some implementations, the deflector actuator 100 can be arranged outside of the dispersion nozzle 26, can be coupled to the deflector via a belt 102 (e.g., a timing belt), and can rotate the deflector 96 via the belt through various arcuate positions—parallel to the longitudinal axis of the dispersion nozzle 26—such that the deflector 96 preferentially scatters spices toward corresponding regions of the cavity 82. For example, the deflector actuator 100 can: pivot the deflector 96 to a 0° position to preferentially scatter spices toward the front of the foodstuff 12; pivot the deflector 96 to a 45° position to preferentially scatter spices toward a front-right region of the foodstuff 12; pivot the deflector 96 to a 90° position to preferentially scatter spices toward the right side of the foodstuff 12; pivot the deflector 96 to a 135° position to preferentially scatter spices toward a right-rear region of the foodstuff 12; and pivot the deflector 96 to a 180° position to preferentially scatter spices toward the rear of the foodstuff 12; etc. In some implementations, the dispersion nozzle 26 can support the deflector 96 on a multi-axis gimbal, and the deflector actuator 100 can also pivot the deflector 96 about an axis perpendicular to the inlet 64, as described above, in order to adjust fore and aft bias of spice distribution as the deflector 96 is pivoted about an axis parallel to the axis of the inlet 64.

However, the deflector 96 can define any other form, and the system can include any other one or more actuators configured to manipulate the deflector 96 in any other way or in any other axis or axes.

As described above, the metering system 22 can dispense multiple spices into the holding chamber 24 per spice application cycle (i.e., before triggering the gas supply 66 to blow contents of the holding chamber 24 into the dispersion nozzle 26 and onto the foodstuff 12 below).

In the variation described above in which the deflector 96 is manipulable between two or more positions, once the conveyance system 14 positions the foodstuff 12 into the seasoning position, the system 10 can group spices or spice blends for which similar or identical distribution patterns are specified in a food order corresponding to the foodstuff; the metering system 22 can then dispense specified volumes of these spices or spice blends into the holding chamber 24, the deflector actuator 100 can position the deflector 96 according to the corresponding distribution pattern, and the gas supply 66 can release a burst of gas to blow these spices into the dispersion nozzle 26 and onto the foodstuff to complete a spice application cycle. In this example, if the food order for the foodstuff 12 specifies application of an additional spice or spice blend in a second, different distribution pattern, the system 10 can group spices or spice blends for the second distribution pattern specified in the food order, the metering system 22 can dispense specified volumes of these spices or spice blends into the holding chamber 24, the deflector actuator 100 can reposition the deflector 96 according to the second distribution pattern, and the gas supply 66 can release a second burst of gas to blow these spices into the dispersion nozzle 26 and onto the foodstuff 12 to complete a second spice application cycle for the foodstuff 12. The system 10 can repeat this process for each unique distribution pattern specified in the food order in order to achieve varying densities of spices throughout the foodstuff 12, thereby achieving a dynamic flavor profile throughout the foodstuff 12 and a dynamic dining experience for a patron consuming the foodstuff 12.

The system 10 can also dispense spices or spice blends across multiple levels of a foodstuff, such as across both sides of a hamburger patty during assembly of a hamburger within the system 10. For example, the conveyance system 14 can advance an open sandwich box—containing a bun heel inside-face-up in the base of the open sandwich box and a bun crown inside-face-up in the top of the open sandwich box—through a series of topping modules to collect servings of various toppings (e.g., tomato, onion, pickle, lettuce, etc.) on the bun heel and cheese on the bun crown as specified in the food order assigned to the contents of the open sandwich box. The conveyance system 14 can then advance the open sandwich box into the seasoning position, and the metering system 22, dispersion nozzle 26, and the gas supply 66 can cooperate to dispense one or more spices and/or spice blends over a last topping serving dispensed onto the inside of the bun heel in one or more spice cycles according to the food order. A patty grilling subsystem within the system 10 can then dispense a grilled hamburger patty onto the bun heel—over the spices just dispensed—and the metering system 22, dispersion nozzle 26, and the gas supply 66 can again cooperate to dispense the same or other combination of spices and/or spice blends onto the patty in one or more spice cycles according to the food order. However, the system 10 can dispense spices or spice blends onto a foodstuff in any other number of spice cycles and/or in any other number of layers within a foodstuff.

Figure 8:
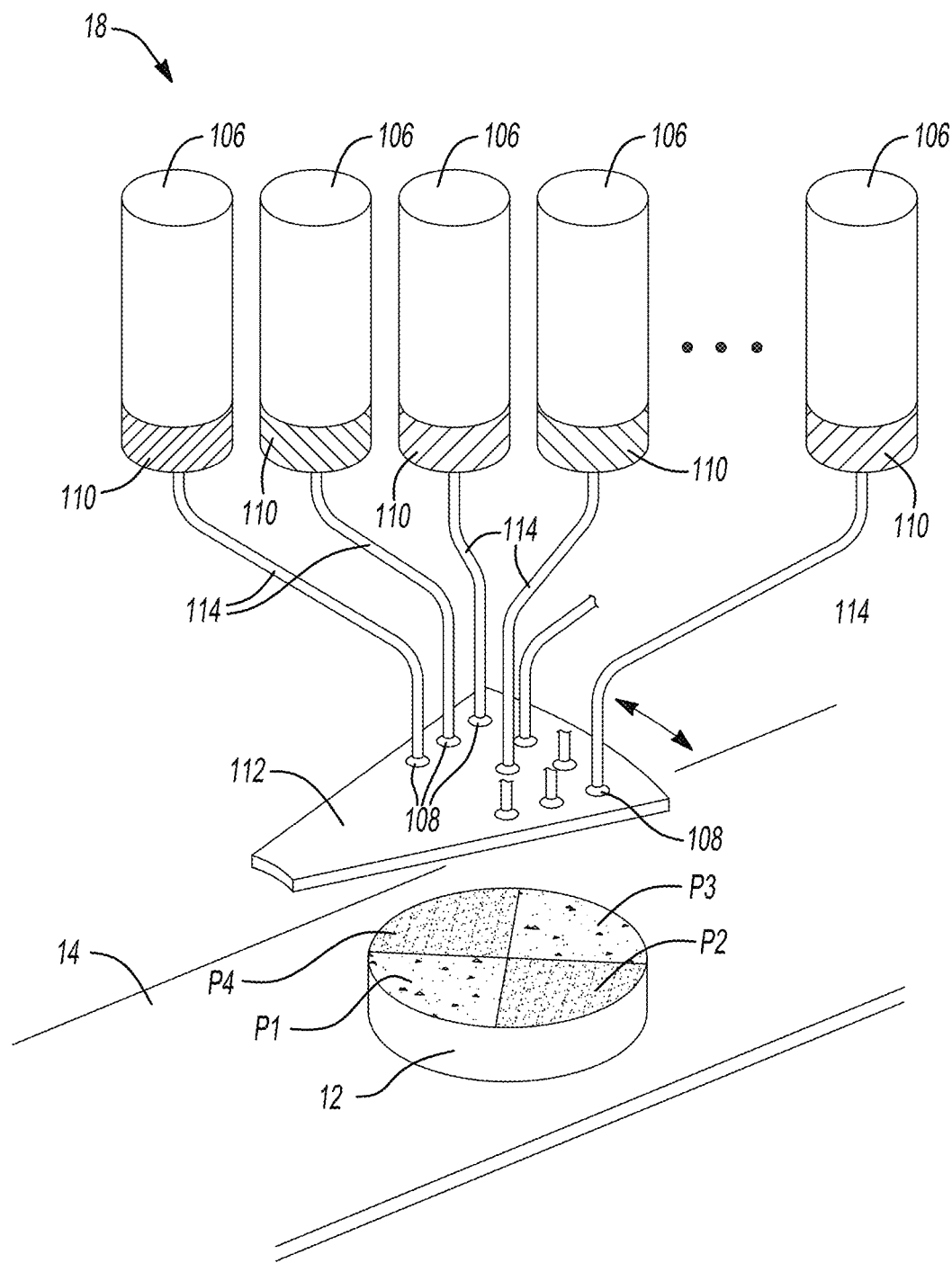
FIG. 8 is a perspective view of a sauce-dispensing system of the automated food preparation system of FIG. 1.

Referring now to FIG. 8, the sauce dispenser 18 may include: one or more sauce reservoirs 106 configured to contain a volume of sauce; one or more extruders (openings or nozzles) 108 fluidly coupled to the one or more sauce reservoirs 106; one or more pumps 110 configured to pump sauce from the one or more sauce reservoirs 106 to the one or more extruders 108; and a scanning head 112 (e.g., an X-Y gantry-type scanning head, a wiper on a linear slide, etc.) configured to scan the one or more extruders 108 over the foodstuff 12 in one or more dimensions.

Each of the reservoirs 106 may be fluidly coupled with a corresponding one of the pumps 110. That is, each reservoir 106 may have its own pump 110, which may be mounted to an end of the reservoir 106. Each reservoir 106 may be fluidly coupled to a respective one of the extruders 108 by a conduit 114. The extruders 108 are mounted to and may extend through the scanning head 112. A motor and a drive mechanism (e.g., a gantry, a linear slide mechanism, an arcuate slide mechanism, or any other type of linkage or mechanism) may be coupled to the scanning head 112 to move the scanning head 112 relative to the foodstuff 12 in the sauce position to apply one or more sauces via one or more extruders 108 to a selected one or more regions of the foodstuff 12.

The sauce-dispensing system 18 can implement methods and techniques described herein to selectively dispense a volume of sauce onto one or more regions of the foodstuff 12 (e.g., over melted cheese on a bun crown). For example, one of the sauce reservoirs 106 can contain a volume of a first sauce such as ketchup, and the pump 110 corresponding to that sauce reservoir 106 can intermittently pump ketchup from the ketchup reservoir 106 through the corresponding extruder 108 as the scanning head 112 scans the extruder 108 over one semicircular area of a bun crown such that only one half of the hamburger has ketchup. In this example, a patron can specify ketchup on a first side of the hamburger to complement a black peppercorn spice blend designated for this first side of the hamburger, and the patron can specify no ketchup on a second side of the hamburger, which may otherwise conflict (according to some patrons' tastes) with a ginger teriyaki spice blend designated for the second half of the hamburger.

In configurations having multiple sauce reservoirs 106, each reservoir 106 may contain a different one of a plurality of sauces (e.g., chipotle mayo, Dijon mustard, ketchup, mayonnaise, hot sauce, BBQ sauce, garlic spread, pesto, ranch, yellow mustard, or salsa verde). The control module of the system 10 can selectively and intermittently actuate one or more of the pumps 110 as the scanning head 112 moves the extruders 108 over a surface of the foodstuff 12 to dispense select sauces onto select regions of the foodstuff 12 according to a (custom) sauce order associated with the foodstuff 12. In one example, a patron can specify a first one or more sauces (e.g., chipotle mayo) on a first portion P1 (e.g., a first quadrant) of the custom hamburger, a second one or more sauces (e.g., ketchup and mayonnaise) on a second portion P2 (e.g., a second quadrant) of the custom hamburger, a third one or more sauces (e.g., garlic spread) on a third portion P3 (e.g., a third quadrant) of the custom hamburger, and a fourth one or more sauces (e.g., garlic spread and pesto) on a fourth portion P4 (e.g., a fourth quadrant) of the custom hamburger in a custom hamburger order, as shown in FIG. 8. In this example, when a bun crown assigned to the patron's custom hamburger order enters a sauce position under the scanning head 112, the control module of the system 10 can selectively actuate pumps 110 coupled to the chipotle mayo, ketchup, mayonnaise, garlic spread, and pesto reservoirs 106 as the scanning head 12 moves the extruders 108 laterally and longitudinally over the bun crown in order to deposit volumes of these sauces according to the sauce pattern specified in the patron's custom hamburger order. Therefore, in this variation, the system 10 can receive a custom hamburger order that specifies one or more sauces applied over all or select regions of a corresponding hamburger, and the sauce-dispensing system 18 can execute this sauce pattern to generate a custom hamburger with custom amounts of one or more sauces in custom locations on this hamburger.

In some configurations, the control module of the system 10 can include or be in communication (wired or wireless communication) with a menu interface that presents multiple hamburger menu items supported by the system 10. In this example, if a patron is not able to decide between two (or more) hamburger menu items, the patron can select both hamburger menu items, and the menu interface can automatically generate a custom sauce specification that specifies deposition of a first sauce for the first hamburger menu item on a first half of a custom hamburger and that specifies deposition of a second sauce for the second hamburger menu item on a second half of the custom hamburger based on the patron's selection of two hamburger menu items. In this example, the menu interface can also automatically generate a custom seasoning specification that specifies deposition of a first spice for the first hamburger menu item biased heavily toward the first half of the custom hamburger and that specifies deposition of a second spice for the second hamburger menu item biased heavily toward the second half of the custom hamburger based on the patron's selection. The system can then execute this custom sauce specification and this custom seasoning specification to produce a custom hamburger representative on its first half of the first hamburger menu item selected by the patron and representative on its second half of the second hamburger menu item selected by the patron.

However, the system and the sauce-dispensing system 18 can include any other structure and can function in any other way to selectively dispense one or more sauces across all or a portion of the foodstuff 12 according to a custom food order, and the system 10 can function in any other way to assemble the foodstuff 12 with one or more uniformly distributed and/or biased spices, spice blends, and/or sauces.

Referring now to FIGS. 9-12, another sauce-dispensing system 118 is provided that may be incorporated into the system 10 instead of or in addition to the sauce-dispensing system 18. As described above with respect to the sauce-dispensing system 18, the control module of the system 10 can operate the sauce-dispensing system 118 to dispense one or more sauces onto one or more selected regions of the foodstuff 12. The sauce-dispensing system 118 may include a mounting structure 120, an inner structure 122 (FIGS. 11 and 12), a scanning head 124, a scanning head motor assembly 126, a tubing-slack-management assembly 128, and a plurality of first conduits or tubes 130*a*, and a plurality of second conduits or tubes 130*b*.

The mounting structure 120 may be plate mounted to a motor-driven linear guide assembly or linkage configured to move the sauce-dispensing system 118 relative to the conveyance assembly 14. The mounting structure 120 may include a first aperture 132 and a second aperture 134. The tubes 130*a*, 130*b* may be routed through the first and second apertures 132, 134, as shown in FIG. 10.

Figure 11:
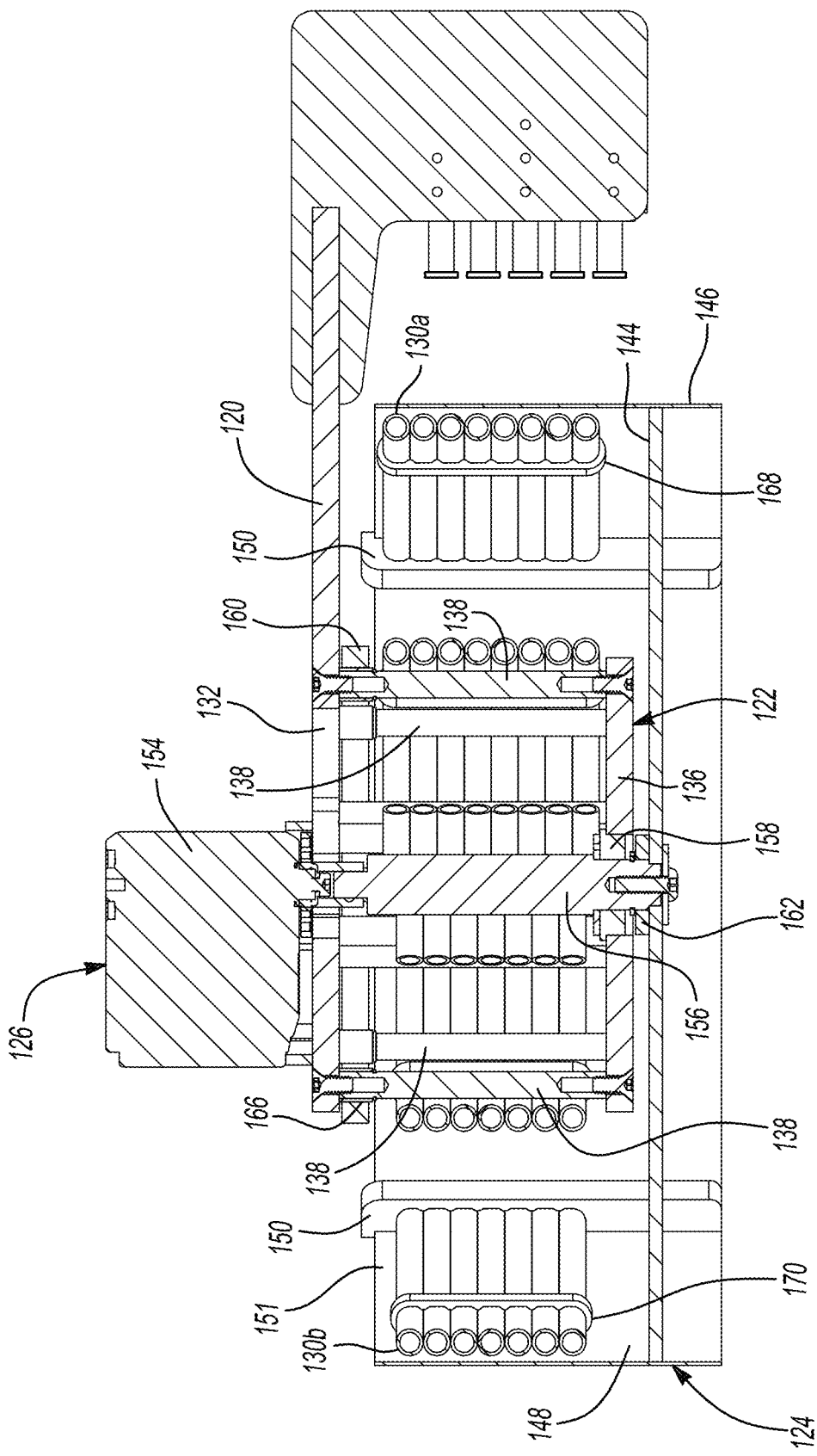
FIG. 11 is a cross-sectional view of the sauce-dispensing system of FIG. 9.
Figure 12:
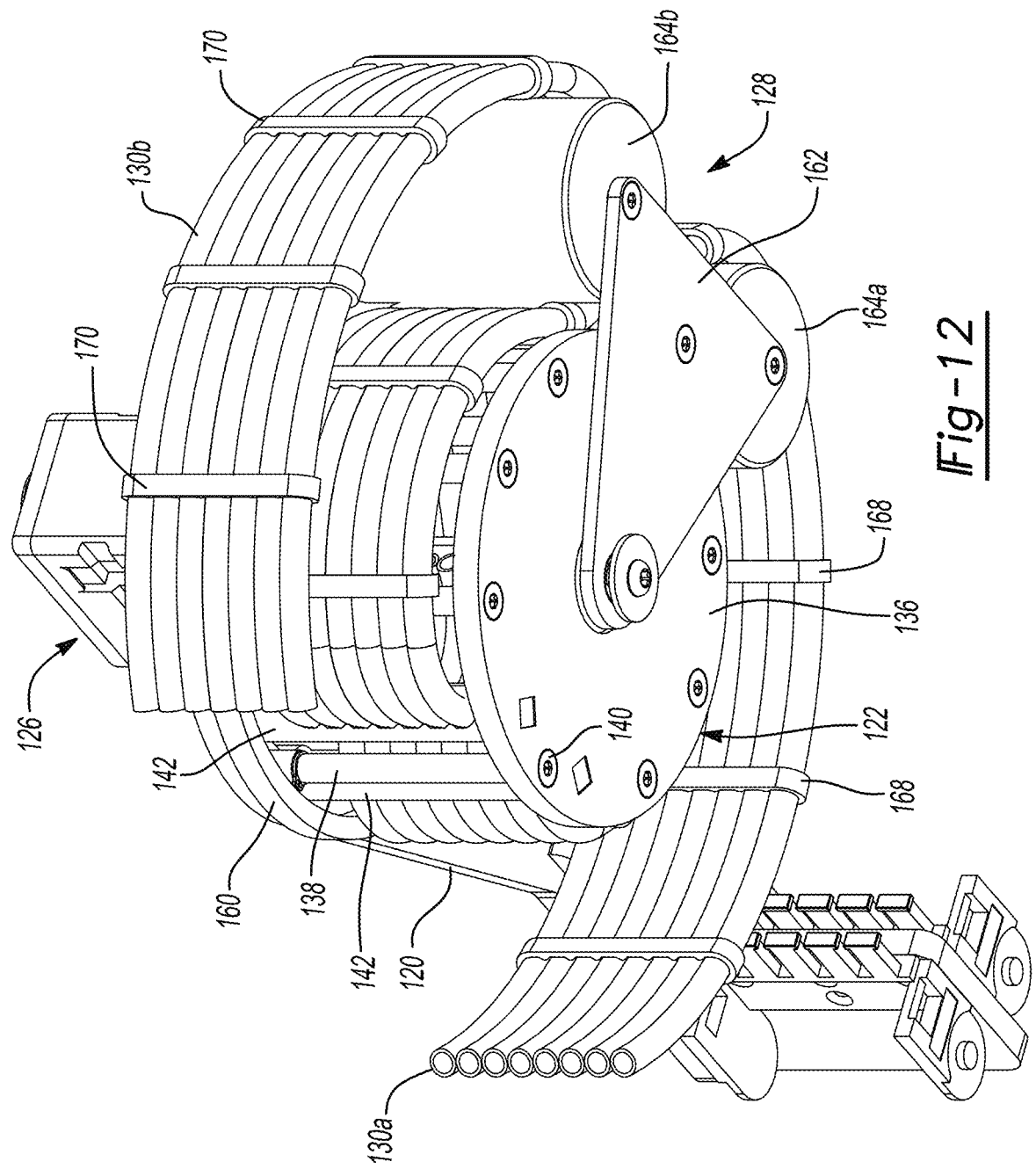
FIG. 12 is a perspective view of the sauce-dispensing system of FIG. 9 with a scanning head of the sauce-dispensing system removed.

As shown in FIGS. 11 and 12, the inner structure 122 may include a disc-shaped plate 136 and a plurality of support columns 138. The support columns 138 are fixed to the plate 136 and to the mounting structure 120 by a plurality of fasteners 140. A pair of tubing brackets 142 (FIG. 12) may be fixedly mounted to the plate 136 and/or the mounting structure 120. One of the tubing brackets 142 may fixedly engage the first tubes 130*a*, and the other tubing bracket 142 may fixedly engage the second tubes 130*b*.

Figure 9:
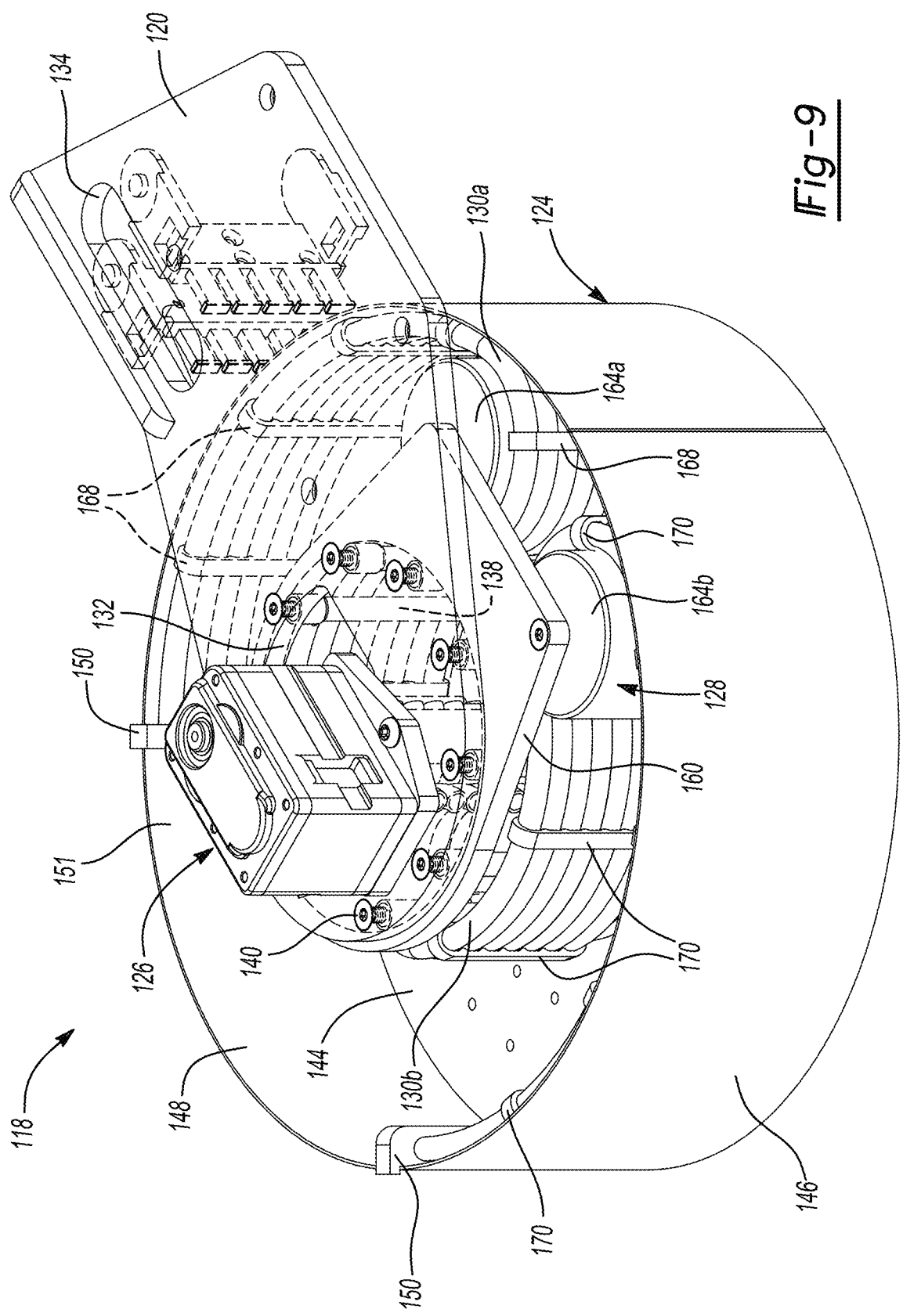
FIG. 9 is a perspective view of another configuration of a sauce-dispensing system of the automated food preparation system of FIG. 1.
Figure 10:
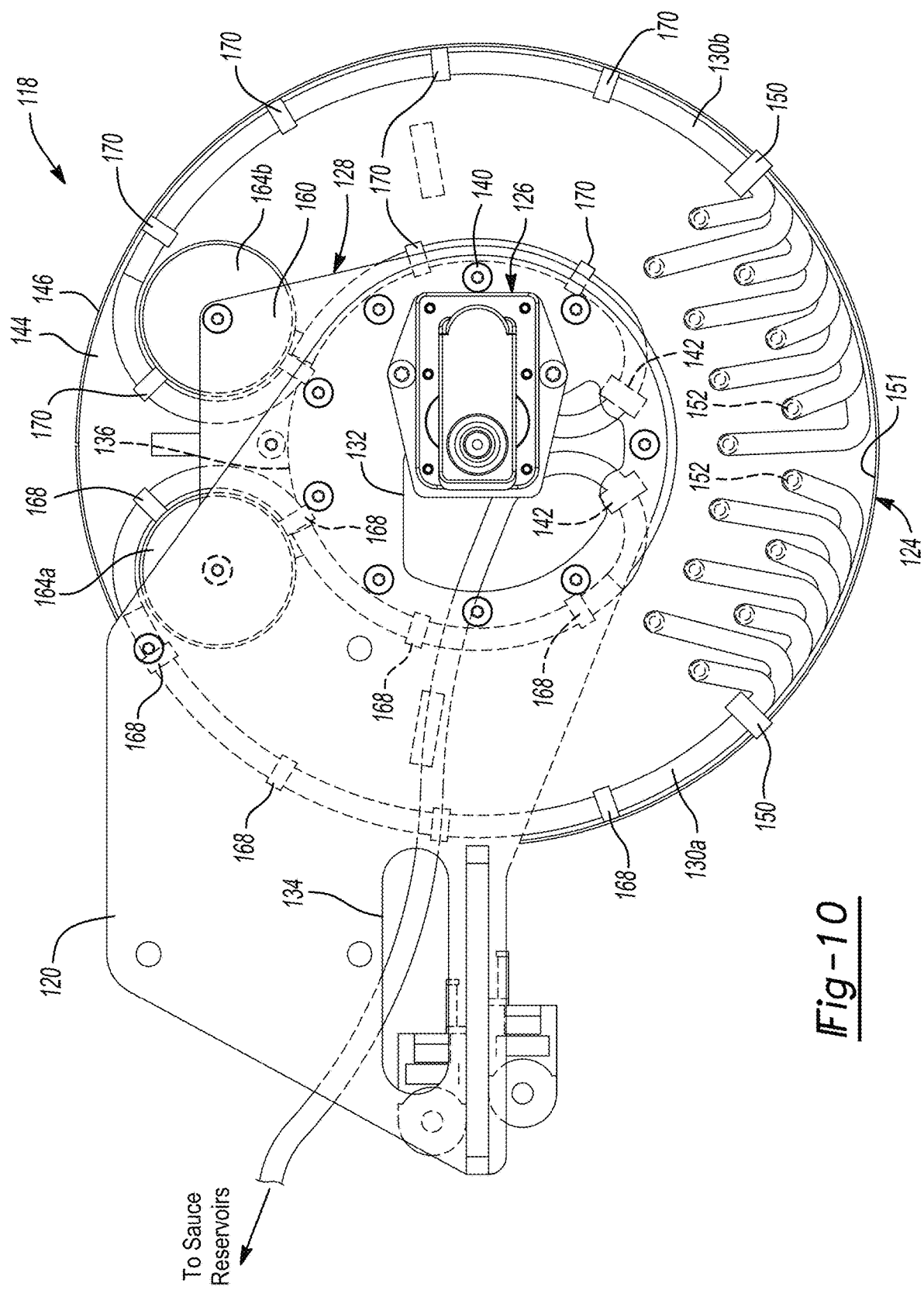
FIG. 10 is a plan view of the sauce-dispensing system of FIG. 9.

As shown in FIGS. 9-11, the scanning head 124 may include a disc-shaped plate 144 and a cylindrical shroud 146 that surrounds the plate 144 and is fixed thereto. The plate 144 and shroud 146 define a cavity 148 in which the inner structure 122, the tubing-slack-management assembly 128, and at least portions of the tubes 130*a*, 130*b* are disposed. A pair of tubing brackets 150 may be fixedly attached to an inner diametrical surface 151 of the shroud 146. One of the tubing brackets 150 may fixedly engage the first tubes 130*a*, and the other tubing bracket 150 may fixedly engage the second tubes 130*b*.

As shown in FIG. 10, the plate 144 may include a plurality of extruders (openings or nozzles) 152 extending therethrough. A first end of each of the tubes 130*a*, 130*b* may be coupled to a respective one of the extruders 152. A second end of each of the tubes 130*a*, 130*b* may be coupled to a respective one of a plurality of sauce reservoirs (e.g., like the sauce reservoirs 106 described above). Each sauce reservoir may include a pump that can pump sauce from the reservoir through the respective tube 130*a*, 130*b* and through the respective extruder 152 and onto the foodstuff 12 in the sauce position.

As shown in FIG. 11, the scanning head motor assembly 126 may include a motor 154 and an output shaft 156. The motor 154 is mounted to the mounting structure 120. The output shaft 156 is coupled to and driven by the motor 154 and extends through the first aperture 132 in the mounting structure 120 and through an aperture in the plate 136 of the inner structure 122 and engages the plate 144 of the scanning head 124 such that the plate 144 is rotationally fixed to the output shaft 156. Therefore, operation of the motor 154 causes rotation of the output shaft 156 and the scanning head 124 relative to the mounting structure 120 and the inner structure 122. As shown in FIG. 11, a bearing 158 attached to the plate 136 of the inner structure 122 may rotatably support the output shaft 156. The control module of the system 10 may control operation of the motor 154 to cause movement of the scanning head 124 to position the scanning head as needed to dispense sauce from the extruders 152 onto selected portions of the foodstuff 12.

As shown in FIGS. 9, 10, and 12, the tubing-slack-management assembly 128 may include an upper plate 160, a lower plate 162 (FIG. 12), a first cylinder 164*a*, and a second cylinder 164*b*. The upper plate 160 may include an aperture 166 through which the support columns 138 extend. The lower plate 162 may include an aperture through which the output shaft 156 extends. The lower plate 162 may be vertically supported by the plate 144 of the scanning head 124 (as shown in FIG. 11) and may be disposed between the plate 144 and the plate 136 of the inner structure 122.

The cylinders 164*a*, 164*b* may be attached at one axial end to the upper plate 160 and attached at the other axial end to the lower plate 162. In this manner, the upper and lower plates 160, 162 may be fixed relative to each other by the cylinders 164*a*, 164*b*. In some configurations, the cylinders 164*a*, 164*b* may be rotatable relative to the upper and lower plates 160, 162 about longitudinal axes of the cylinders 164*a*, 164*b*. While the output shaft 156 extends through the lower plate 162, the lower plate 162 is not rotationally fixed to the output shaft 156. That is, the lower plate 162 is free to rotate relative to the output shaft 156 such that the upper and lower plates 160, 162 and the cylinders 164*a*, 164*b* are rotatable together relative to the mounting structure 120, the inner structure 122, the scanning head 124, and the motor assembly 126.

The first tubes 130*a* may be bound to each other by a first plurality of straps 168 disposed at various locations along the lengths of the first tubes 130*a* between the tubing brackets 142, 150. Similarly, the second tubes 130*b* may be bound to each other by a second plurality of straps 170 disposed at various locations along the lengths of the second tubes 130*b* between the tubing brackets 142, 150. The straps 168, 170 are not fixed relative the scanning head 124, the inner structure 122, or the mounting structure 120.

As described above, a first end of each of the tubes 130*a*, 130*b* may be coupled to a respective one of the extruders 152. A second end of each of the tubes 130*a*, 130*b* may be coupled to a respective one of a plurality of sauce reservoirs (e.g., like the sauce reservoirs 106 described above). As shown in FIG. 10, the first tubes 130*a* extend from their respective extruders 152, through their respective tubing bracket 150, along a portion of the inner diametrical surface 151 of the shroud 146, partially around the first cylinder 164*a*, through their respective tubing bracket 142, up through the first aperture 132 in the mounting structure 120, and through the second aperture 134 in the mounting structure 120 to the their respective sauce reservoirs. Similarly, the second tubes 130b extend from their respective extruders 152, through their respective tubing bracket 150, along a portion of the inner diametrical surface 151 of the shroud 146, partially around the second cylinder 164b, through their respective tubing bracket 142, up through the first aperture 132 in the mounting structure 120, and through the second aperture 134 in the mounting structure 120 to the their respective sauce reservoirs.

As the scanning head 124 rotates relative to the mounting structure 120 and the inner structure 122, the tubing-slack-management assembly 128 is allowed to freely rotate relative to the inner structure 122 to remove slack from the tubes 130a, 130b to prevent the tubes 130a, 130b from tangling or binding. For example, when the scanning head 124 rotates in a clockwise direction (when viewed from the frame of reference of FIG. 10) relative to the mounting structure 120 and the inner structure 122, the second tubes 130b will tend to pull the second cylinder 164b in the clockwise direction, thereby rotating the entire tubing-slack-management assembly 128 in the clockwise direction. Such rotation of the tubing-slack-management assembly 128 in the clockwise direction will remove any slack in the first tubes 130a caused by rotation of the scanning head 124 in the clockwise direction. Similarly, when the scanning head 124 rotates in a counterclockwise direction (when viewed from the frame of reference of FIG. 10) relative to the mounting structure 120 and the inner structure 122, the first tubes 130a will tend to pull the first cylinder 164a in the counterclockwise direction, thereby rotating the entire tubing-slack-management assembly 128 in the counterclockwise direction. Such rotation of the tubing-slack-management assembly 128 in the counterclockwise direction will remove any slack in the second tubes 130b caused by rotation of the scanning head 124 in the counterclockwise direction.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An automated on-demand food preparation system comprising:
    a plurality of sauce reservoirs each configured to contain a respective one of a plurality of sauces;
    a plurality of tubes;
    a scanning head including a plate with a plurality of openings; and
    a control module configured to, in response to a custom food order for a foodstuff, perform a dispense operation for each of a set of the sauces onto the foodstuff,
    wherein:
    each of the openings is coupled with a respective one of the sauce reservoirs via a respective one of the tubes,
    the set of sauces is specified by the custom food order, and
    for each sauce of the set of sauces:
        the dispense operation includes dispensing a volume of the sauce onto a set of regions of the foodstuff,
        the set of regions for the sauce is specified by the custom food order,
        the volume of the sauce dispensed through the respective opening is specified by the custom food order, and
        the dispense operation includes causing a relative movement of the scanning head and the foodstuff to position the respective opening over the set of regions.

2. The food preparation system of claim 1 wherein the foodstuff is a sandwich and the set of regions includes a top portion of the sandwich and a bottom portion of the sandwich.

3. The food preparation system of claim 2 wherein the top portion of the sandwich is defined by a first piece of bread and the bottom portion of the sandwich is defined by a second piece of bread.

4. The food preparation system of claim 3 wherein the first piece of bread is a bun crown and the second piece of bread is a bun heel.

5. The food preparation system of claim 1 wherein the foodstuff is a sandwich and the set of regions includes a first half of a top portion of the sandwich, a second half of the top portion, a first half of a bottom portion of the sandwich, and a second half of the bottom portion.

6. The food preparation system of claim 1 wherein the foodstuff is a sandwich and the set of regions includes four quadrants of a top portion of the sandwich and four quadrants of a bottom portion of the sandwich.

7. The food preparation system of claim 1 wherein the scanning head is movable relative to the foodstuff.

8. The food preparation system of claim 1 further comprising:
    a conveyance system configured to transport the foodstuff between a sauce position and a second position,
    wherein the foodstuff is at least partially disposed below the openings when in the sauce position, and
    wherein the wherein the foodstuff is not disposed below the openings when in the second position.

9. The food preparation system of claim 1 further comprising:
    a pump system configured to selectively pump the sauces through the tubes from the sauce reservoirs,
    wherein the control module is configured to control the pump system, during the dispense operation for each of the set of sauces, to dispense the volume specified by the custom food order for the respective sauce.

10. The food preparation system of claim 9 wherein the pump system includes a plurality of pumps corresponding respectively to the sauce reservoirs.

11. The food preparation system of claim 9 wherein the control module is configured to, for each sauce of the set of sauces, selectively actuate the pump system while causing the relative movement of the scanning head and the foodstuff to distribute the sauce across the specified set of regions.

12. The food preparation system of claim 1 wherein:
the control module is configured to receive the custom food order via network communication with an ordering system that presents a menu interface to a patron, and
the ordering system generates the custom food order based on input from the patron.

13. The food preparation system of claim 1 wherein:
the scanning head includes a cylindrical shroud fixed relative to the plate, and
the plate is disposed within a cavity defined by the cylindrical shroud.

14. The food preparation system of claim 13 further comprising:
a mounting structure; and
a motor assembly mounted to the mounting structure,
wherein the motor assembly is drivingly coupled to the scanning head and operable to rotate the scanning head relative to the mounting structure.

15. The food preparation system of claim 14 wherein an output shaft of the motor assembly is received in the plate and is configured to rotate the plate and the cylindrical shroud about a longitudinal axis of the cylindrical shroud.

16. The food preparation system of claim 13 wherein:
the plurality of tubes includes a plurality of first tubes and a plurality of second tubes,
first portions of the first tubes are attached to and extend along a first portion of an inner diametrical surface of the cylindrical shroud and first portions of the second tubes are attached to and extend along a second portion of the inner diametrical surface,
second portions of the first tubes are attached to and extend partially around an inner structure that is fixed to a mounting structure and received in the cavity of the cylindrical shroud, and
second portions of the second tubes are attached to and extend partially around the inner structure.

17. The food preparation system of claim 16 wherein the scanning head is configured to rotate with respect to the mounting structure.

18. The food preparation system of claim 16 further comprising:
a tubing-slack-management assembly received with the cavity of the cylindrical shroud,
wherein:
the tubing-slack-management assembly is rotatable relative to the inner structure and the scanning head about a longitudinal axis of the cylindrical shroud,
the tubing-slack-management assembly includes a first cylinder and a second cylinder,
the first cylinder engages third portions of the first tubes disposed along lengths of the first tubes between the first portions of the first tubes and the second portions of the second tubes, and
the second cylinder engages third portions of the second tubes disposed along lengths of the second tubes between the first portions of the second tubes and the second portions of the second tubes.

19. The food preparation system of claim 18 wherein the first and second cylinders are disposed within the cavity of the cylindrical shroud and radially between the inner diametrical surface of the cylindrical shroud and the inner structure.

20. The food preparation system of claim 19 wherein:
the first and second tubes curl inward from the second portions of the first and second tubes and extend up through an aperture in the mounting structure, and
the aperture in the mounting structure is disposed radially inward relative to the second portions of the first and second tubes.

21. The food preparation system of claim 20 wherein:
the tubing-slack-management assembly includes an upper plate attached to first axial ends of the first and second cylinders and a lower plate attached to second axial ends of the first and second cylinders, and
the upper and lower plates are fixed relative to each other and are rotatable with the first and second cylinders relative to the inner structure and the scanning head.

22. The food preparation system of claim 21 wherein:
the lower plate is disposed axially between the inner structure and the plate of the scanning head, and
the lower plate includes an aperture through which an output shaft of a motor assembly extends.

23. The food preparation system of claim 22 wherein the motor assembly is configured to rotate the scanning head with respect to the mounting structure.

* * * * *